(12) United States Patent
Radmand et al.

(10) Patent No.: US 11,310,870 B2
(45) Date of Patent: *Apr. 19, 2022

(54) EDGE COMPUTING FULL-MESH INTERNET OF THINGS GATEWAY

(71) Applicant: Connectivia Labs, Inc., Cumming, GA (US)

(72) Inventors: Pedram Radmand, Irvine, CA (US); Ricardo R. Velasco, Cumming, GA (US)

(73) Assignee: Connectivia Labs, Inc., Cumming, GA (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/671,071

(22) Filed: Oct. 31, 2019

(65) Prior Publication Data

US 2021/0136869 A1 May 6, 2021

(51) Int. Cl.
| H04W 88/16 | (2009.01) |
| H04W 84/18 | (2009.01) |
| H04W 84/12 | (2009.01) |
| H04L 12/24 | (2006.01) |
| H04W 88/06 | (2009.01) |
| H04W 92/02 | (2009.01) |
| H04L 41/16 | (2022.01) |

(52) U.S. Cl.
CPC ............ *H04W 88/16* (2013.01); *H04L 41/16* (2013.01); *H04W 84/12* (2013.01); *H04W 84/18* (2013.01); *H04W 88/06* (2013.01); *H04W 92/02* (2013.01)

(58) Field of Classification Search
CPC ..... H04W 88/16; H04W 88/06; H04W 84/18; H04W 84/12; H04W 92/02; H04L 41/16
See application file for complete search history.

(56) References Cited

U.S. PATENT DOCUMENTS

| 10,506,461 | B2* | 12/2019 | Radmand | H04W 36/08 |
| 10,924,343 | B1* | 2/2021 | Shukla | H04L 41/0816 |
| 2010/0008256 | A1* | 1/2010 | Chebbo | H04W 84/18 |
| | | | | 370/254 |
| 2011/0235504 | A1* | 9/2011 | Nozaki | H04L 45/04 |
| | | | | 370/221 |
| 2017/0135033 | A1* | 5/2017 | Vecera | H04W 48/06 |
| 2019/0377592 | A1* | 12/2019 | Verma | G06F 9/5027 |
| 2020/0145440 | A1* | 5/2020 | Mohan | H04L 63/1433 |
| 2020/0195495 | A1* | 6/2020 | Parker | H04W 48/18 |

* cited by examiner

*Primary Examiner* — Robert C Scheibel
(74) *Attorney, Agent, or Firm* — Holland & Hart LLP

(57) ABSTRACT

Methods, systems, and devices for wireless communications are described. In one example, a method includes determining one or more parameters corresponding to each of two or more gateways in a first network, selecting a first gateway of the two or more gateways based at least in part on the one or more parameters, and instructing at least a second gateway of the two or more gateways to send data to the first gateway, wherein the first gateway provides the data to a second network.

20 Claims, 15 Drawing Sheets

EDGE COMPUTING FULL-MESH INTERNET OF THINGS GATEWAY

SUMMARY

The described techniques relate to improved methods, systems, devices, and apparatuses that support methods for edge computing in full mesh networks. Generally, the described techniques provide for edge computing in full-mesh networks.

A method of wireless communication is described. The method may include determining one or more parameters corresponding to each of two or more gateways in a first network, selecting a first gateway of the two or more gateways based on the one or more parameters, and instructing at least a second gateway of the two or more gateways to send data to the first gateway, where the first gateway provides the data to a second network.

An apparatus for wireless communication is described. The apparatus may include a processor, memory coupled with the processor, and instructions stored in the memory. The instructions may be executable by the processor to cause the apparatus to determine one or more parameters corresponding to each of two or more gateways in a first network, select a first gateway of the two or more gateways based on the one or more parameters, and instruct at least a second gateway of the two or more gateways to send data to the first gateway, where the first gateway provides the data to a second network.

Another apparatus for wireless communication is described. The apparatus may include means for determining one or more parameters corresponding to each of two or more gateways in a first network, selecting a first gateway of the two or more gateways based on the one or more parameters, and instructing at least a second gateway of the two or more gateways to send data to the first gateway, where the first gateway provides the data to a second network.

A non-transitory computer-readable medium storing code for wireless communication is described. The code may include instructions executable by a processor to determine one or more parameters corresponding to each of two or more gateways in a first network, select a first gateway of the two or more gateways based on the one or more parameters, and instruct at least a second gateway of the two or more gateways to send data to the first gateway, where the first gateway provides the data to a second network.

Some examples of the method, apparatuses, and non-transitory computer-readable medium described herein may further include operations, features, means, or instructions for selecting a third gateway of the two or more gateways based on the one or more parameters, and instructing at least a fourth gateway of the two or more gateways to send data to the third gateway.

Some examples of the method, apparatuses, and non-transitory computer-readable medium described herein may further include operations, features, means, or instructions for receiving the data at the first gateway from at least the second gateway of the two or more gateways, and sending the data to the second network via the first gateway.

Some examples of the method, apparatuses, and non-transitory computer-readable medium described herein may further include operations, features, means, or instructions for performing data filtering on the data at the first gateway to generate filtered data, where sending the data to the second network further includes sending the filtered data.

Some examples of the method, apparatuses, and non-transitory computer-readable medium described herein may further include operations, features, means, or instructions for performing an analytics analysis on the data at the first gateway to generate information, where sending the data to the second network further includes sending the information.

Some examples of the method, apparatuses, and non-transitory computer-readable medium described herein may further include operations, features, means, or instructions for forwarding the data to a third gateway, where the third gateway neighbors the first gateway and sends the data to the second network.

Some examples of the method, apparatuses, and non-transitory computer-readable medium described herein may further include operations, features, means, or instructions for determining a geo-location of the one or more nodes.

In some examples of the method, apparatuses, and non-transitory computer-readable medium described herein, determining the one or more parameters further may include operations, features, means, or instructions for determining the one or more parameters corresponding to each of two or more gateways in the first network at a second time, and updating the selected first gateway of the two or more gateways based on the one or more parameters determined at the second time.

Some examples of the method, apparatuses, and non-transitory computer-readable medium described herein may further include operations, features, means, or instructions for instructing all other gateways of the two or more gateways to send additional data to the first gateway, where the first gateway provides the additional data to the second network.

Some examples of the method, apparatuses, and non-transitory computer-readable medium described herein may further include operations, features, means, or instructions for providing the data to an edge computer connected with the first network.

In some examples of the method, apparatuses, and non-transitory computer-readable medium described herein, selecting the first gateway of the two or more gateways based on the one or more parameters further may include operations, features, means, or instructions for comparing the one or more parameters of each gateway of the two or more gateways, and determining that the first gateway may be the least busy gateway of the two or more gateways based on the comparison.

DETAILED DESCRIPTION

Figure 1:
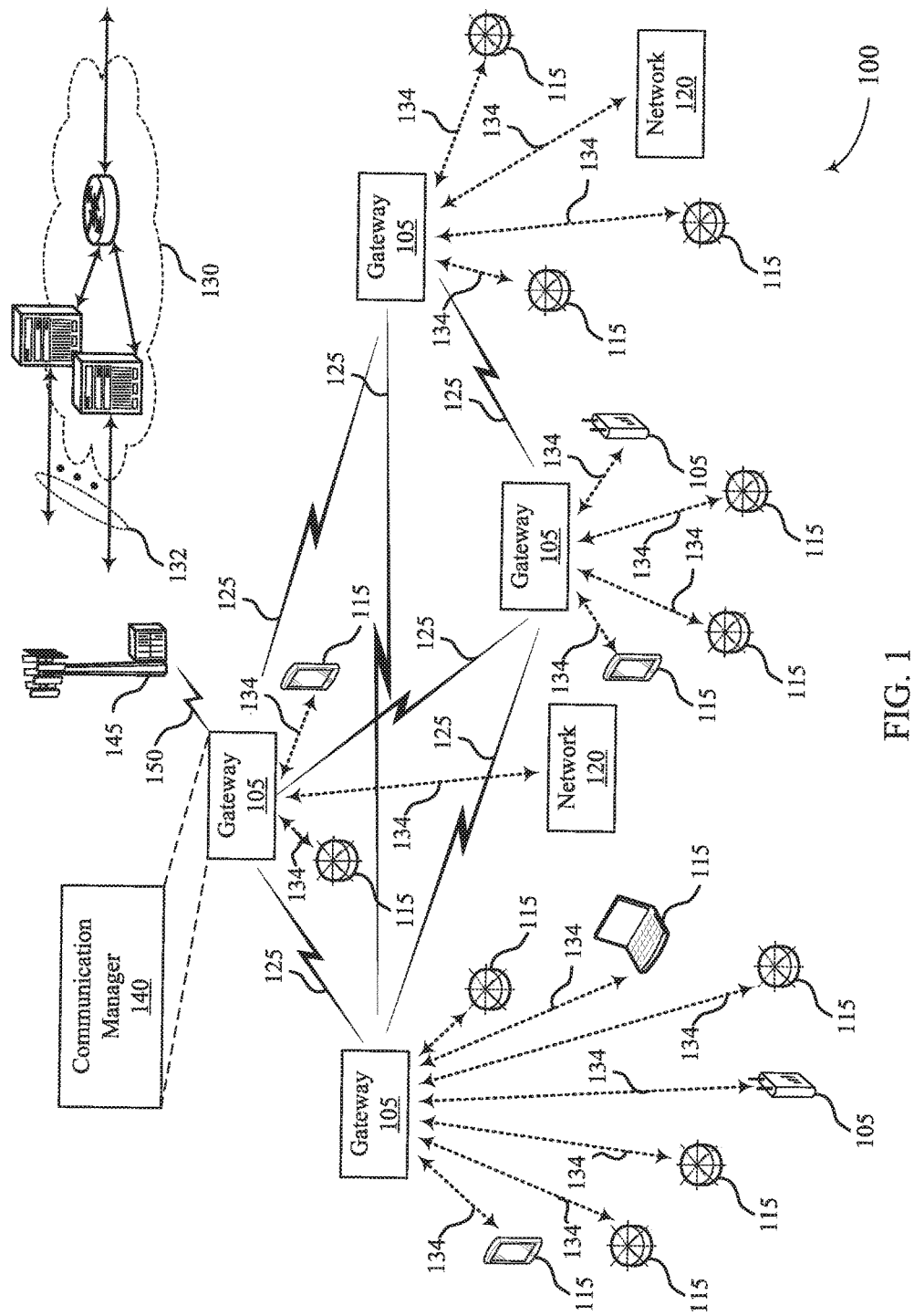
FIG. 1 illustrates an example of a system for wireless communications that supports methods for edge computing in full mesh networks in accordance with aspects of the present disclosure.

The described techniques relate to improved methods, systems, devices, and apparatuses that support edge computing at gateways in full-mesh networks. Generally, the described techniques provide for an algorithm and architecture for nomination of a subset of gateways in a first network to communicate data from the first network to a second network. A first network may be a full-mesh network that incorporates a plurality of gateways each connected to one or more nodes and uses a first protocol, such as a LoRaWAN protocol. The first network is a full-mesh network because the gateways are all directly connected to each other. The gateways may be able to communication with a second, external network, such as a cloud network.

Techniques described herein nominate a gateway among all the gateways to act as a primary gateway for communications with the external network. A full-mesh algorithm is described that can compare parameters of all the gateways to select a primary gateway to forward data between the full-mesh network and the external network. When a single gateway is nominated as a primary gateway, this may be referred to as single-sink. In some networks, more than one gateway will be nominated as a primary gateway, which may be referred to as multi-sink. The full-mesh algorithm can calculate several factors using the gateway parameters in real-time, such as delay, data rate, and network traffic, to determine which gateway is the least busy and may be best suited to deliver data and information to the cloud. This gateway would be selected as a primary gateway. All gateways within the full-mesh network may send their data and information to one of the primary gateways to deliver the data and information to the cloud.

The one or more primary gateways will deliver data through another network, such as Wi-Fi, Ethernet, wired, or Long Term Evolution (LTE), or New Radio (NR), to the cloud. The gateways may be long range (LoRa) gateways, such as LoRaWAN gateways, which may use the LoRaWAN protocol. The gateways may capture data produced by one or more connected nodes, such as electronic devices such as an Internet of Things (IoT) devices or any other LPWAN protocols. The full-mesh network may implement protocols such as LoRaWAN stack, LPWAN, and 6LoRaWAN, among other protocols. In some full-mesh examples, 6lowpan protocols may be used, where LoRaWAN is used to gather data from the IoT devices. LoRaWAN may be the protocol used between IoT devices and one or more gateways. In some examples, an RPL algorithm may be used with the 6LoW-PAN protocol.

The full-mesh algorithm may also incorporate edge computing that is conventionally performed at the cloud. The edge computing may include performing data analytics or data filtering of node data. Performing edge computing may reduce the amount of traffic to the cloud, reduce latency among the network, reduce power consumption, speed up processing of the data and information, and increase and improve local decision making.

The techniques described herein may implement full stack wireless protocols along with data analytic software to create a framework for a full-mesh network. In some examples, the software may include artificial intelligence (AI), machine learning (ML), or LPWAN components. In some examples, LPWAN components may include AI or ML features. The AI or ML may be used to improve functioning of the full-mesh network as described herein. Other wireless protocols may be seamlessly added to the framework. The full-mesh network, devices, and algorithm described herein may improve network performance, improve reliability, reduce the amount of network traffic, and save on costs and power consumption.

Techniques described herein include a dynamic ad hoc private network that provides various services without cloud connection. All LoRaWAN cloud components can be moved to the edge (e.g., at the gateway), enabling services such as data analytics, artificial intelligence, machine learning, and other services to be performed on the edge without cloud connection. Additionally, a geo-location server is also moved from the cloud to the edge, which can create a network that does not use the Global Positioning System (GPS) by setting up three triangulation gateways within the network. The Free-GPS network can use time-stamps of a sensor to calculate a geo-location of an object (e.g., a sensor, gateway, etc.) by determining the attitude, longitude, and elevation of the object. These processes and services may be done within a private network without cloud access.

Some examples provide a portable dynamic network using three portable gateways and one or more sensors. The portable dynamic network may be used in many applications to provide services independent of satellite networks and mobile communications infrastructure. For example, an Internet of Battlefield Things may employ the private ad hoc network to track soldiers and provide them with communications. For example, soldiers may carry a sensor (e.g., in the form of a patch, or the like) that is connected to the network. Three soldiers that each carry a portable gateway may have the full functionality of edge computing and triangulation abilities. This network be mobile and can be satellite and mobile infrastructure independent. For example, a commander may, using a laptop, mobile phone, or other computing device, be able to track and monitor any soldiers or resources which carry or have small sensors that can be tracked by the network.

Additionally, techniques described herein may provide end-to-end tracking. In some examples, the triangulation Free-GPS network may work where there is no other network availability, such as indoors or in remote places without any satellite coverage (e.g., no global navigation satellite system (GNSS) coverage, such as GPS). These techniques can be applied to long distance asset tracking. For example, an object may be tracked from one point to another using the triangulation Free-GPS techniques. These techniques may be able to track the object in locations where there is no other network connection options, such as in a remote location (e.g., a location in the ocean) or within an indoor environment where a GNSS signal may not penetrate (e.g., a warehouse, a ship, etc.).

In some examples, the triangulation Free-GPS techniques described herein may be used in conjunction with a GPS system. For example, a GPS satellite may be used to track assets in a truck or at a port. Using sensors modules equipped with GPS modules, a sensor module can receive a geo-positioning signal from a satellite network and then send those received geo-positioning from the satellite network through a LPWAN or LoRaWAN network, for example, to a gateway installed (permanently or temporarily) inside the truck or port. This gateway may be a simple LoRaWAN gateway without triangulation and full-mesh mechanism to gather data from the sensors and buffer the data. The geo-location sensor module may be buffered for each step along an object's travel. The gateway may provide an end-to-end seamless asset tracking solution that may be applied to any static or dynamic asset.

Aspects of the disclosure are initially described in the context of a few examples of wireless communications systems. Aspects of the disclosure are further described in the context of flow diagrams and flowcharts. Aspects of the disclosure are further illustrated by and described with reference to apparatus diagrams, system diagrams, and flowcharts that relate to methods for edge computing in full mesh networks.

FIG. 1 illustrates an example of a wireless communications system 100 that supports methods for edge computing in full mesh networks in accordance with aspects of the present disclosure. The wireless communications system 100 includes gateways 105, nodes 115, and a core network 130. In some examples, the wireless communications system 100 may be an IoT network in communication with the core network 130.

One or more of gateways 105 may communication with a base station 145 over a communication link 150, which in turn may communicate with core network 130. A base station 145 may be a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include an LTE network, an LTE-Advanced (LTE-A) network, an LTE-A Pro network, a NR network, an Ethereum Network (Eth), or the like. A NR network may also be referred to as a 5G network. In some cases, wireless communications system 100 may support enhanced broadband communications, ultra-reliable (e.g., mission critical) communications, low latency communications, or communications with low-cost and low-complexity devices.

Gateways 105 may wirelessly communicate with nodes 115 via one or more antennas or wired connections. Gateways 105 may be networking hardware that enables data flow from one network to another network. Gateways 105 described herein may include or may be referred to by those skilled in the art as network gateways, telecommunications gateways, or computer gateways. Wireless communications system 100 may include gateways 105 of different types such as a LoRaWAN gateway, an IoT gateway, an Internet Protocol (IP) gateway, an Internet-to-Orbit (I2O) gateway, a cloud storage gateway, a gateway that runs a specific protocol, or the like. A LoRaWAN gateway, for example, may use the LoRaWAN protocol, such as a Pedram Gateway. The nodes 115 described herein may be able to communicate with various types of gateways 105 and network equipment. The nodes 115 described herein may be able to communicate with various types of gateways 105 and network equipment including macro eNBs, small cell eNBs, gNBs, relay base stations, and the like.

Each gateway 105 may be associated with a particular IoT network in which communications with various nodes 115 are supported. Each gateway 105 may provide network interfacing services for a respective geographic coverage area via communication links 134 between a gateway 105 and a node 115. Each gateway 105 may be connected to one or more other gateways 115 via communication links 125. In some examples, the communication links 125, 134, and 150 may utilize one or more carriers. Communication links 134 shown in wireless communications system 100 may include uplink transmissions from a node 115 to a gateway 105, or downlink transmissions from a gateway 105 to a node 115. Downlink transmissions may also be called forward link transmissions while uplink transmissions may also be called reverse link transmissions. Likewise, communication links 125 may include uplink transmissions from a gateway 105 to another gateway 105, or downlink transmissions from the gateway 105 to the other gateway 105. In some examples, a carrier may support multiple cells, and different cells may be configured according to different protocol types (e.g., machine-type communication (MTC), narrowband Internet-of-Things (NB-IoT), enhanced mobile broadband (eMBB), or others).

Every gateways 105 may be communicatively coupled with every other gateway 105 in wireless communications system 100. Gateways 105 may be directly connected with every other gateway 105. When each gateway 105 is connected to every other gateway 105, this creates a full-mesh network. A full-mesh network is a network that has a network topology where every gateway is connected to every other gateway. Full-mesh networks can have increased reliability over networks that are partial mesh (e.g., where only some gateways 105 are connected to other gateways 105). A full-mesh network may also reduce the costs and amount of data transferred within the network or to an external network. For example, a full-mesh network may also reduce the cost of data deliver in remote areas, where data delivery through a satellite network is expensive.

A geographic coverage area for a gateway 105 may be divided into sectors making up a portion of the geographic coverage area, and each sector may be associated with a cell. For example, each gateway 105 may provide communication coverage for a macro cell, a small cell, a hot spot, or other types of cells, or various combinations thereof. In some examples, a gateway 105 may be movable and therefore provide communication coverage for a moving geographic coverage area. In some examples, different geographic coverage areas associated with different technologies may overlap, and overlapping geographic coverage areas associated with different technologies may be supported by the same gateway 105 or by different gateways 105. The wireless communications system 100 may include, for example, a heterogeneous LTE/LTE-A/LTE-A Pro or NR network in which different types of gateways 105 provide coverage for various geographic coverage areas.

The term "cell" refers to a logical communication entity used for communication with a base station 145 or a gateway 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area (e.g., a sector) over which the logical entity operates.

Nodes 115 may be dispersed throughout the wireless communications system 100, and each node 115 may be stationary or mobile. A node 115 may also be referred to as a mobile device, a wireless device, a remote device, a handheld device, a subscriber device, a sensor, an IoT device, an end device, or some other suitable terminology, where the "device" may also be referred to as a unit, a station, a terminal, or a client. In some examples, a node 115 may also refer to a wireless local loop (WLL) station, an IoT device, a smart device, an Internet of Everything (IoE) device, or an MTC device, or the like, which may be implemented in various articles such as appliances, vehicles, meters, or the like. A node 115 may also be a personal electronic device such as a cellular phone, a personal digital assistant (PDA), a tablet computer, a laptop computer, a personal computer, a home appliance, a personal equipment, a machine, or the like. Each node 115 may be associated with a single gateway 105, which may result in no data redundancy among the wireless communications network 100.

Some nodes 115, such as MTC or IoT devices, may be low cost or low complexity devices, and may provide for automated communication between machines (e.g., via Machine-to-Machine (M2M) communication). M2M communication or MTC may refer to data communication technologies that allow devices such as nodes 115 to communicate with one another or a gateway 105 without human intervention. In some examples, M2M communication or MTC may include communications from devices that integrate sensors or meters to measure or capture information and relay that information to a central server or application program that can make use of the information or present the information to humans interacting with the program or application. Some nodes 115 may be designed to collect information or enable automated behavior of machines. Examples of applications for IoT or MTC devices include smart metering, inventory monitoring, water level monitoring, equipment monitoring, healthcare monitoring, wildlife monitoring, weather and geological event monitoring, fleet management and tracking, remote security sensing, physical access control, home automation systems, and transaction-based business charging and, asset tracking, oil and gas mining, Internet of Battlefield Things (IoBT) for connected soldiers, supervisory control and data acquisition (SCADA), geo-fencing, anti-theft, and tracking. For example, assets may be tracked using techniques described herein, where it may be possible to determine if a normally stationary asset has moved, which may be useful for anti-theft for construction sites, utility yards, airports, campuses, and the like. Furthermore, tracking slow-moving people or assets where infrequent positions updates may be sufficient, such as people, pets, livestock, herds, vehicles, etc., may be applicable to smart agriculture and smart city use cases.

Some nodes 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for nodes 115 include entering a power saving "deep sleep" mode when not engaging in active communications, or operating over a limited bandwidth (e.g., according to narrowband communications). In some cases, nodes 115 may be designed to support critical functions (e.g., mission critical functions), and a wireless communications system 100 may be configured to provide ultra-reliable communications for these functions.

In some cases, a node 115 may also be able to communicate directly with other nodes 115 (e.g., using a peer-to-peer (P2P) or device-to-device (D2D) protocol). One or more of a group of nodes 115 utilizing D2D communications may be within the geographic coverage area of a gateway 105. Other nodes 115 in such a group may be outside the geographic coverage area of a gateway 105, or be otherwise unable to receive transmissions from a gateway 105. In some cases, groups of nodes 115 communicating via D2D communications may utilize a one-to-many (1:M) system in which each node 115 transmits to every other node 115 in the group. In some cases, a gateway 105 facilitates the scheduling of resources for D2D communications. In other cases, D2D communications are carried out between nodes 115 without the involvement of a gateway 105.

Gateways 105 may communicate with core network 130 and with one another. For example, gateways 105 may interface with core network 130 through backhaul links 132 (e.g., via an S1, N2, N3, or other interface). In some examples, a gateway 105 may access core network 130 via external communication system, such as an LTE system utilizing base stations. Gateways 105 may communicate with one another over communication links 125 (e.g., via an X2, Xn, or other interface) either directly (e.g., directly between gateways 105) or indirectly (e.g., via core network 130).

Core network 130 may provide user authentication, access authorization, tracking, Internet Protocol (IP) connectivity, and other access, routing, or mobility functions. Core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for nodes 115 served by gateways 105 or base stations 145 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 145 or a gateway 105, may include or be connected to a device that includes subcomponents such as an access network entity, which may be an example of an access node controller (ANC). Each access network entity may communicate with nodes 115 through a number of other access network transmission entities, which may be referred to as a radio head, a smart radio head, or a transmission/reception point (TRP). In some configurations, various functions of each access network entity or gateway 105 may be distributed across various network devices (e.g., radio heads and access network controllers) or consolidated into a single network device (e.g., a gateway 105).

Wireless communications system 100 may operate using one or more different radio frequency spectrums. Wireless communications system 100 may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between nodes 115 and gateways 105, and EHF antennas of the respective devices may be even smaller and more closely spaced than UHF antennas. In some cases, this may facilitate use of antenna arrays within a node 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may also operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to nodes 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as a base station 145 may employ listen-before-talk (LBT) procedures to ensure a frequency channel is clear before transmitting data to each other or to core network 130. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base stations 145, gateways 105, or nodes 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a gateway 105) and a receiving device (e.g., a node 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a gateway 105, a node 115, or a base station 145) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a gateway 105 may use multiple antennas or antenna arrays to conduct beamforming operations for directional communications with a node 115 or a base station 145. For instance, some signals (e.g. synchronization signals, reference signals, beam selection signals, or other control signals) may be transmitted by a gateway 105 multiple times in different directions, which may include a signal being transmitted according to different beamforming weight sets associated with different directions of transmission. Transmissions in different beam directions may be used to identify (e.g., by gateway 105 or a receiving device, such as a node 115) a beam direction for subsequent transmission and/or reception by gateway 105.

Some signals, such as data signals associated with a particular receiving device, may be transmitted by a gateway 105 in a single beam direction (e.g., a direction associated with the receiving device, such as a node 115). In some examples, the beam direction associated with transmissions along a single beam direction may be determined based at least in in part on a signal that was transmitted in different beam directions. For example, a node 115 may receive one or more of the signals transmitted by gateway 105 in different directions, and node 115 may report to gateway 105 an indication of the signal it received with a highest signal quality, or an otherwise acceptable signal quality. Although these techniques are described with reference to signals transmitted in one or more directions by a gateway 105, a node 115 or base station 145 may employ similar techniques for transmitting signals multiple times in different directions (e.g., for identifying a beam direction for subsequent transmission or reception by node 115), or transmitting a signal in a single direction (e.g., for transmitting data to a receiving device).

A receiving device (e.g., a node 115, which may be an example of a mmW receiving device) may try multiple receive beams when receiving various signals from gateway 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 145, a gateway 105, or a node 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 145 may be located in diverse geographic locations. A base station 145 may have an antenna array with a number of rows and columns of antenna ports that the base station 145 may use to support beamforming of communications with a node 115. Likewise, a gateway 105 or a node 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a node 115 and a gateway 105 or core network 130 supporting radio bearers for user plane data. At the Physical layer, transport channels may be mapped to physical channels.

In some cases, base stations 145, nodes 115, and gateways 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a base station 145, a node 115, and a gateway 105.

The term "carrier" refers to a set of radio frequency spectrum resources having a defined physical layer structure for supporting communications over a communication link 125 or 150. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by Nodes 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served node 115 may be configured for operating over portions or all of the carrier bandwidth. In other examples, some nodes 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a node 115 receives and the higher the order of the modulation scheme, the higher the data rate may be for the node 115. In MIMO systems, a wireless communications resource may refer to a combination of a radio frequency spectrum resource, a time resource, and a spatial resource (e.g., spatial layers), and the use of multiple spatial layers may further increase the data rate for communications with a node 115.

Devices of the wireless communications system 100 (e.g., base stations 145, gateways 105, or nodes 115) may have a hardware configuration that supports communications over a particular carrier bandwidth, or may be configurable to support communications over one of a set of carrier bandwidths. In some examples, wireless communications system 100 may include gateways 105 and/or nodes 115 that support simultaneous communications via carriers associated with more than one different carrier bandwidth.

Wireless communications system 100 may support communication with a node 115 on multiple cells or carriers, a feature which may be referred to as carrier aggregation or multi-carrier operation. A node 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by nodes 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a node 115 or gateway 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In the example of FIG. 1, one or more of the gateways 105 may include a communication manager 140, which may select a gateway from a number of gateways to deliver data to core network 130. For example, communication manager 140 may determine one or more parameters corresponding to each of two or more gateways 105. The parameters may be related to various performance metrics of the gateways 105. Based on the one or more parameters, communication manager 140 selects a gateway 105 to deliver data from the other gateways 105 to core network 130. Communication manager 140 instructs at least one of the other gateways 105 to send its data to the selected gateway 105. The selected gateway may provide the data to core network 130. In some examples, the selected gateway 105 may deliver data to core network 130 via base station 145. The selected gateway 105 may perform data filtering, data analytics, AI, or ML on the data and may send information related to the filtered or analyzed data to core network 130. In some examples, the AI or ML may be used to improve predictions to the field and to determine the correct actions for the end-devices, nodes, or sensors. The AI and ML may be part of the edge computing devices.

Wireless communications system 100 provides a gateway 105, which may be used in an IoT network or other low-power wireless network, that can be used with edge computing, data filtering, data analytics, AI, and MI. A gateway 105 may be selected from among the gateways 105 to deliver data through another network (e.g., LTE/Eth/5G) via base station 145 to core network 130 (e.g., the cloud). Techniques are described for selecting the gateway 105 among the plurality of gateways 105 using real-time factors such as delay, data rates, network traffic, packet loss, a number of hops to the external network 130, etc., for delivering data to the cloud. Once a gateway 105 is selected, all the other gateways 105 in the wireless communications system 100 may forward their data and information to the selected gateway 105 for further forwarding.

Figure 2:
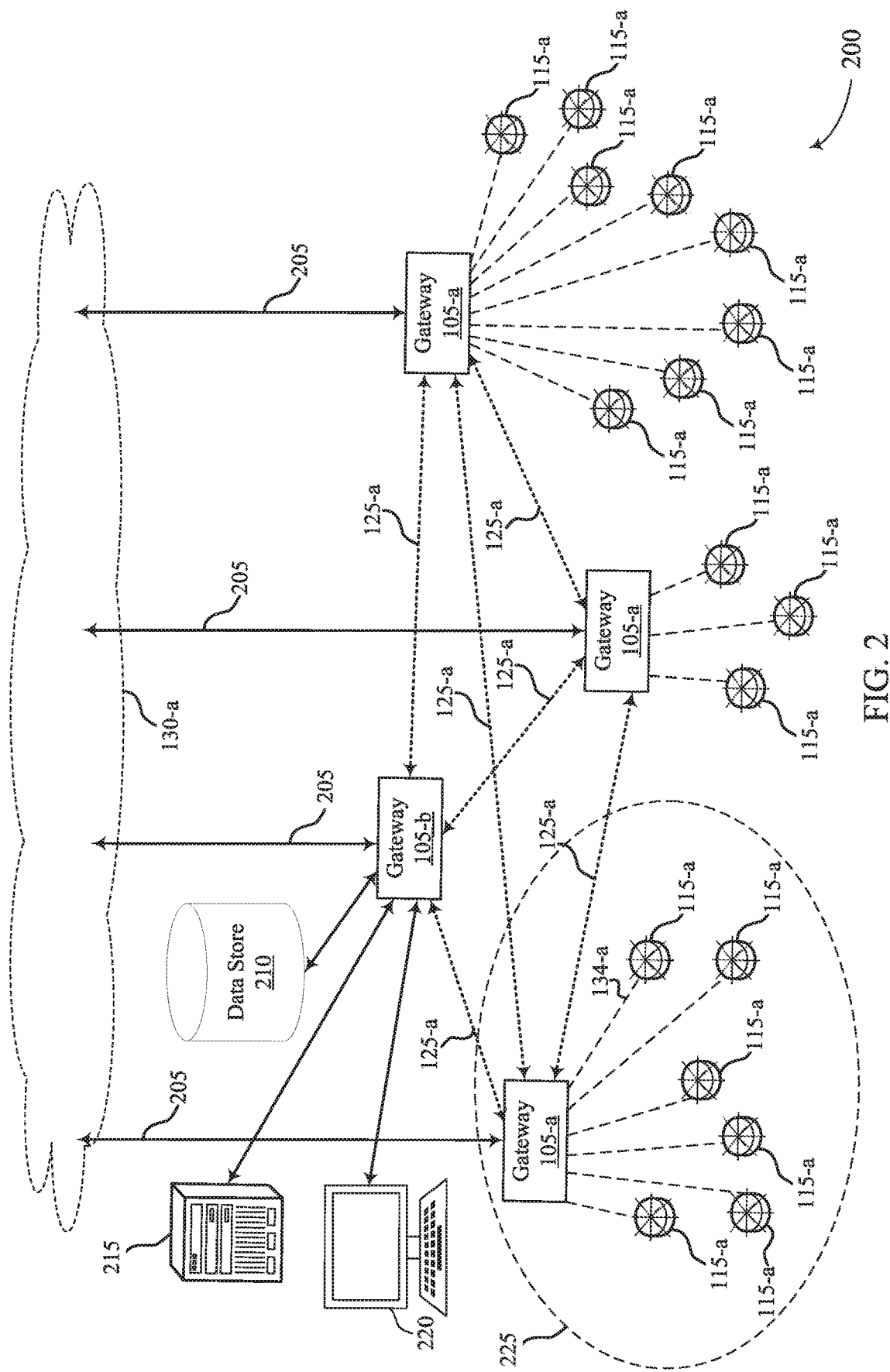
FIG. 2 illustrates an example of another for wireless communications system that supports methods for edge computing in full mesh networks in accordance with aspects of the present disclosure.

FIG. 2 illustrates an example of another wireless communications system 200 that supports methods for edge computing in full mesh networks in accordance with aspects of the present disclosure. In some examples, wireless communications system 200 may implement aspects of wireless communications system 100.

Wireless communications system 200 illustrates an example with four gateways 105-a and 105-b (collectively referred to herein as gateways 105) in a full-mesh network. That is, each gateway 105 is directly communicatively coupled with every other gateway 105 in wireless communications system 200 via communication links 134-a. Each gateway 105 is also communicatively coupled, directly or indirectly, with an external network 130-a.

In some examples, gateways 105 are an example of one or more aspects of a LoRaWAN gateway. A LoRaWAN gateway may use the LoRaWAN protocol, which is a long range, low power wide area network (LPWAN) that provides interoperability among smart or IoT devices. In a LoRaWAN gateway, for example, a gateway 105 may be connected to a network server (whether the network runs in the cloud or is on-premise with one or more gateways or nodes) via a standard IP connection or other type of connection, and nodes 115-a may use single-hop wireless communications to the gateways 105. In other examples, gateways 105 may be examples of other types of gateways or use other protocols, such as 6LoWPAN, Bluetooth low energy (BLE), NB-IoT, 5G, ZigBee, Sigfox, Jasper, Hologram, Lantronix, Wi-Fi, low-power Wi-Fi, 802.11ah protocol, Ingenu (On Ramp), Symphony Link, and the like, including any low-power protocols or wireless protocols.

In some examples, external network 130-a is a cloud network. In other examples, external network 130-a may be another type of network. Each gateway 105 may be connected to external network 130-a via wired or wireless communication links 205.

Gateways 105 may be connected to one or more nodes 115-a. Different gateways 105 may be connected to different numbers of nodes 115. In examples other than that shown in FIG. 2, different numbers of gateways 105 and nodes 115-a may be present.

A gateway 105 may be associated with a geographic coverage area 225, which may include those nodes 115-a to which gateway 105 is connected. Geographic coverage area 225 may correspond with a range of gateway 105, a first network such as an IoT network, a premises, a business, a home, a specific geographic location, a mobile transport carrier, a vehicle, or the like.

One or more of the gateways 105 may be connected to external devices such as data storage devices, servers, edge computing devices, terminals, and the like. In the example of FIG. 2, gateway 105-b is connected to a data storage device 210, a server 215, and an edge computing device 220. Data storage device 210 may be any type of storage device for storing computer and network data. Data storage device 210 may receive data from gateway 105-b and store all or a portion of the data for later retrieval. The data may originate from nodes 115-a associated with any of the gateways 105. That is, gateways 105-a may send data or other information to gateway 105-b over communication links 134-a. Gateway 105-b may forward some or all of that data or information to data storage device 210.

Gateway 105-b may also be connected to server 215. Server 215 may be a network server, such as a LoRaWAN network server, an application server, or a key management server. These servers may be run by an edge computing device or run in the cloud. In some examples, server 215 includes the communications manager, such as communication manager 140 from FIG. 1, that uses parameters associated with gateways 105 to select a particular gateway 105 for forwarding data or information to external network 130-a. In such an example, server 215 would receive one or more parameters associated with each gateway 105 related to performance, load, capacity, speed, battery power, and the like of the respective gateway 105. Server 215 would analyze the one or more parameters to select a gateway to serve as a primary gateway for communication between the full-mesh network and external network 130-a. In such an example, server 215 would provide an indication of the selected gateway 105 to at least gateway 105-b. Gateway 105-b may inform the other gateways 105 of the identity of the selected gateway 105. In other examples, gateway 105-b may also be connected to more than one server 215. Furthermore, gateway 105-b may include the ability to perform some or all of the functions of the one or more servers 215.

Gateway 105-b may also be connected to one or more edge computing devices 220. Edge computing device 220 may provide computing capacities nearer to a data source, a network, or a user. Edge computing device 220 may perform processing, calculations, analytics, or other types of computing, on data and information from the nodes 115-a. Performing edge computing may reduce the amount of data that is sent to external network 130-a, improve security, and improve delay. For example, an aircraft may generate terabytes (TB) of data per hour or a large retail store may generate gigabytes (GB) of data per hour. Sending large amounts of data to external network 130-a, which technically possible, may be cost prohibitive or impractical due to computational capacity requirements, relevancy, network latency, as well as increase the possibility of a more severe security breach or the risk of hacking. Edge computing device 220 may be used to reduce the amount of data the primary gateway 105-b sends to external network 130-a and to improve security.

Figure 3:
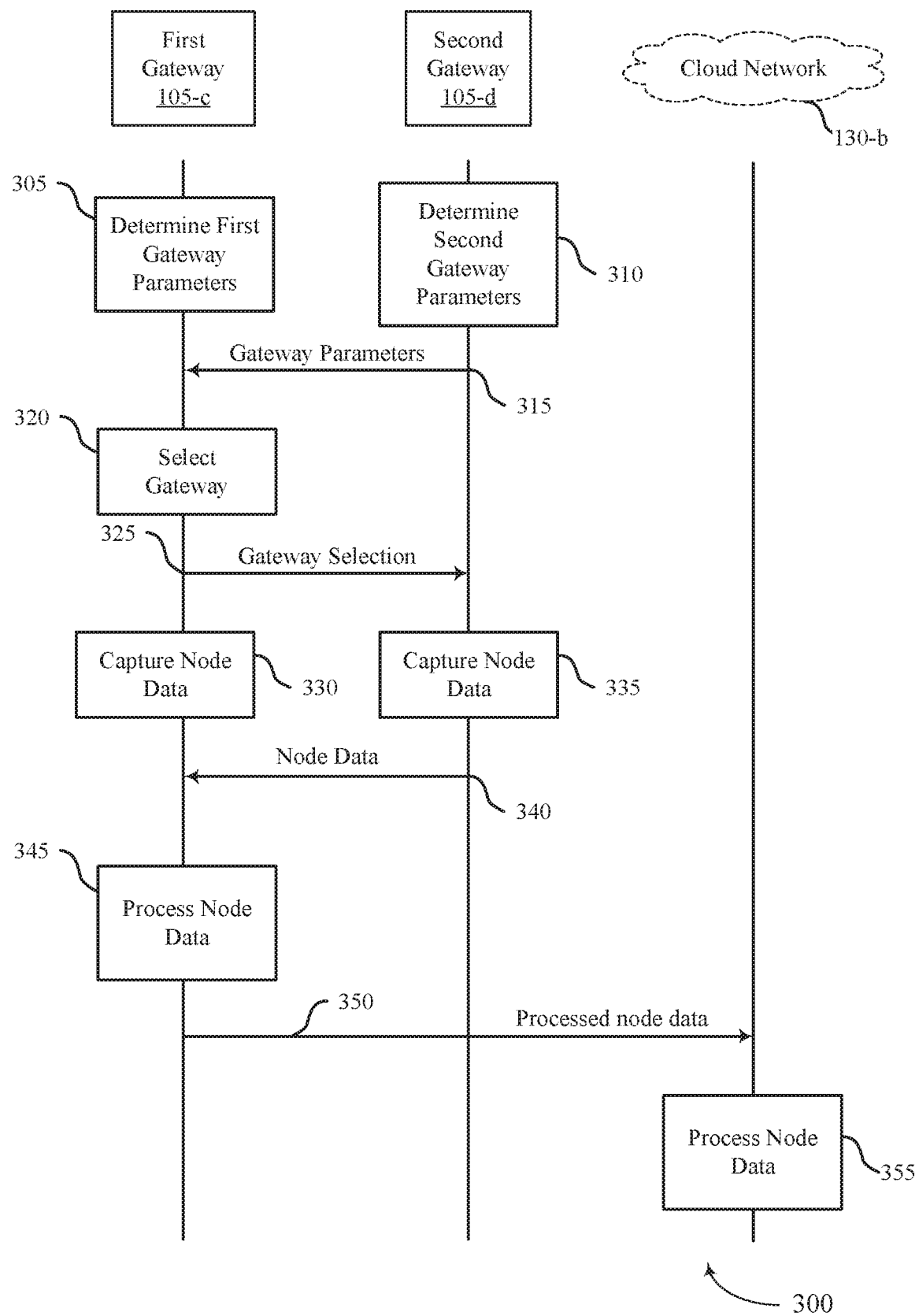
FIG. 3 illustrates an example of a swim diagram that supports gateway selection in full mesh networks in accordance with aspects of the present disclosure.

FIG. 3 illustrates an example of a diagram 300 that supports methods for gateway selection and edge computing in full mesh networks in accordance with aspects of the present disclosure. In some examples, diagram 300 may implement aspects of wireless communications system 100 and 200. Diagram 300 illustrates actions of and communications between a first gateway 105-c, a second gateway 105-d, and a cloud network 130-b. First gateway 105-c, second gateway 105-d, and cloud network 130-b may be examples of gateways 105 and network 130 described in FIGS. 1 and 2. Other gateways 105 may also be part of the example of FIG. 3, and each gateway 105 may be connected to one or more nodes as described herein.

At 305, first gateway 105-c determines or identifies one or more parameters associated with first gateway 105-c. Similarly, at 310, second gateway 105-*d* determines or identifies one or more parameters associated with second gateway 105-*d*. The one or more parameters may include, for example, a network delay at the gateway 105, a data rate of the gateway 105, and network traffic at the gateway 105. In some examples, one, two, or three of these parameters may be used for each gateway 105. In other examples, other parameters may be determined or used, such as a performance rating or rank, a quality rating or rank, a signal-to-noise ratio (SNR), a bit error rate (BER), a number of errors or failures during a time period, a number of disconnections, or the like. Second gateway 105-*d* sends gateway parameters 315 to first gateway 105-*c*.

In the example of FIG. 3, first gateway 105-*c* is tasked with processing the gateway parameters and selecting a gateway 105 to correspond with cloud network 130-*b* at 320. That is, in FIG. 3, first gateway 105-*c* determines the one or more parameters corresponding to each of two or more gateways in the mesh network and selects a gateway of the two or more gateways based at least in part on the one or more parameters. In other examples, a different gateway 105 determines the selected gateway. In yet other examples, a server, such as server 215 of FIG. 2, receives the one or more parameters for each gateway and determines the selected gateway. The mesh network may be setup with instructions for which device performs the selection process. In other examples, the device which performs the selection is determined based on one or more features or current conditions.

First gateway 105-*c* sends an indication of the gateway selection 325 to second gateway 105-*d*, as well as to any other gateways in the mesh network. In some examples, first gateway 105-*c* also transmits an indication of the gateway selection to cloud network 130-*b*.

At 330, first gateway 105-*c* captures node data from the nodes to which it is connected. Likewise, at 335, second gateway 105-*d* captures node data from the nodes to which it is connected. Capturing node data may include receiving information or data from one or more nodes, which may or may not be at the request of the gateway. The node data may also be captured from a subset of the nodes connected to the gateway. Further, the node data may be continuously, periodically, or intermittently captured. Second gateway 105-*d* may send its node data 340 to first gateway 105-*c*.

At 345, first gateway 105-*c* may process the node data. In some examples, first gateway 105-*c* processes node data by filtering the data. The data may be filtered using standard filters or based on desired characteristics. In some examples, first gateway 105-*c* processes node data by performing analytics on the data to create information. First gateway 105-*c* may transmit at least a portion of the processed node data 350 to cloud network 130-*b*. In other examples, first gateway 105-*c* sends other information besides node data to external network 130-*c*, such as, but not limited to, gateway parameters, requests for data, requests for application access, other types of data or information, and the like.

However, in some examples, first gateway 105-*c* does not process the node data. In that case, first gateway 105-*c* may transmit at least a portion of the unprocessed node data to cloud network 130-*b*. In some examples, some processing is performed at the edge computing device (which may be the first gateway 105-*c*) while other processing is performed in the cloud. For example, data that requires higher processing levels than what the edge computing device may be capable of (i.e., due to processing power, memory, battery life, network access, etc.) may be processed at the cloud.

Cloud network 130-*b*, upon receiving processed node data 350, may further process the processed node data 350 at 355. Cloud network 130-*b* may utilize the node data in a number of ways, including determining features, qualities, or characteristics of the mesh network, one or more gateways, or one or more nodes of the gateways. This information may be used to improve the functionality of the mesh network or to perform tasks. In some examples, at least some of the node data is stored for later retrieval. Cloud network 130-*b* may compare current node data with historical node data for various functions.

Figure 4:
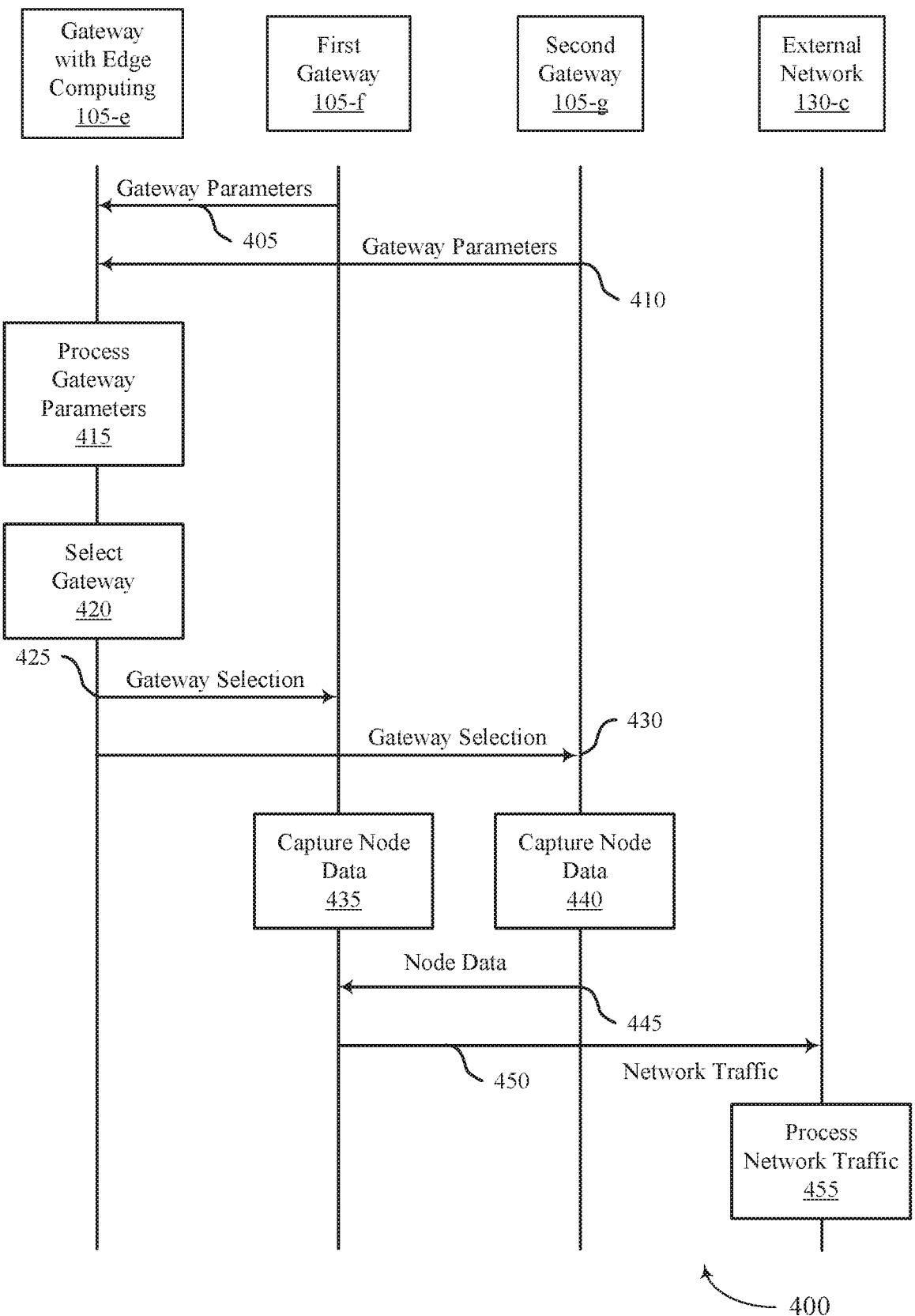
FIG. 4 illustrates another example of a swim diagram that supports gateway selection in full mesh networks in accordance with aspects of the present disclosure.

FIG. 4 illustrates an example of a diagram 400 that supports methods for edge computing in full mesh networks in accordance with aspects of the present disclosure. In some examples, diagram 400 may implement aspects of wireless communications system 100 and 200. Diagram 400 illustrates actions of and communications between a gateway with edge computer 105-*e*, a first gateway 105-*f*, a second gateway 105-*g*, and an external network 130-*c*. Gateway with edge computer 105-*e*, first gateway 105-*f*, second gateway 105-*g*, and external network 130-*c* may be examples of servers 215, gateways 105, and network 130 described in FIGS. 1-3. Other gateways 105 may also be part of the example of FIG. 4, and each gateway 105 may be connected to one or more nodes as described herein.

The gateway with edge computer 105-*e* may be a separate computing device or may be part of a server or a gateway, including the first gateway 105-*g* or the second gateway 105-*h*. In some examples, only some of the gateways 105 may have network access to an external network, such as the cloud.

First gateway 105-*f* sends one or more parameters 405 associated with first gateway 105-*f* to gateway with edge computer 105-*e*. Similarly, second gateway 105-*g* sends one or more parameters 410 associated with second gateway 105-*g* to gateway with edge computer 105-*e*. The gateways 105 may send the one or more parameters at the request of gateway with edge computer 105-*e*. In other examples, the gateways 105 periodically or intermittently send the one or more parameters. In yet other examples, the gateways 105 send the one or more parameters when a change has been detected in the parameters above a threshold amount.

At 415, gateway with edge computer 105-*e* processes the gateway parameters, which may include comparing like parameters among the different gateways 105. The gateway parameters can also be analyzed for trends, such as improving performance at one of the gateways, or increasing delay at another gateway, for example. At 420, gateway with edge computer 105-*e* selects a gateway to communicate with external network 130-*c* based at least in part on the analyzed gateway parameters. Gateway with edge computer 105-*e* sends an indication of the gateway selection 425 and 430 to first gateway 105-*f* and second gateway 105-*g*, respectively, as well as to any other gateways in the mesh network. In some examples, first gateway 105-*f* also transmits an indication of the gateway selection to external network 130-*c*.

The selected gateway will interface with external network 130-*c*, while other gateways 105 do not communicate with external network 130-*c*. In some examples, all traffic generated at or requested by the mesh network to external network 130-*c* is communicated via the selected gateway.

In some examples, the gateway selection is for a particular time duration or for certain times of the day. In some examples, the gateway selection has an expiration, which may be based on time or something else such as a particular change in a gateway parameter of the selected gateway. When the gateway selection expires, other gateways in the mesh network may again directly communicate with cloud network 130-*b* or a new gateway may be selected. In other examples, the gateway selection does not have an expiration, but may be overridden or canceled by one or more of the gateways 105 or gateway with edge computer 105-*e*.

At 435, first gateway 105-*f* captures node data from the nodes to which it is connected. Likewise, at 440, second gateway 105-*g* captures node data from the nodes to which it is connected.

In the example of FIG. 4, first gateway 105-*f* is the selected gateway. Therefore, second gateway 105-*g* sends its node data 445, or other network traffic, to first gateway 105-*f*. In turn, first gateway 105-*f* forwards at least a subset of the node data and other traffic as network traffic 450 to external network 130-*c*. At 455, external network 130-*c* may process the network traffic 450.

Figure 5:
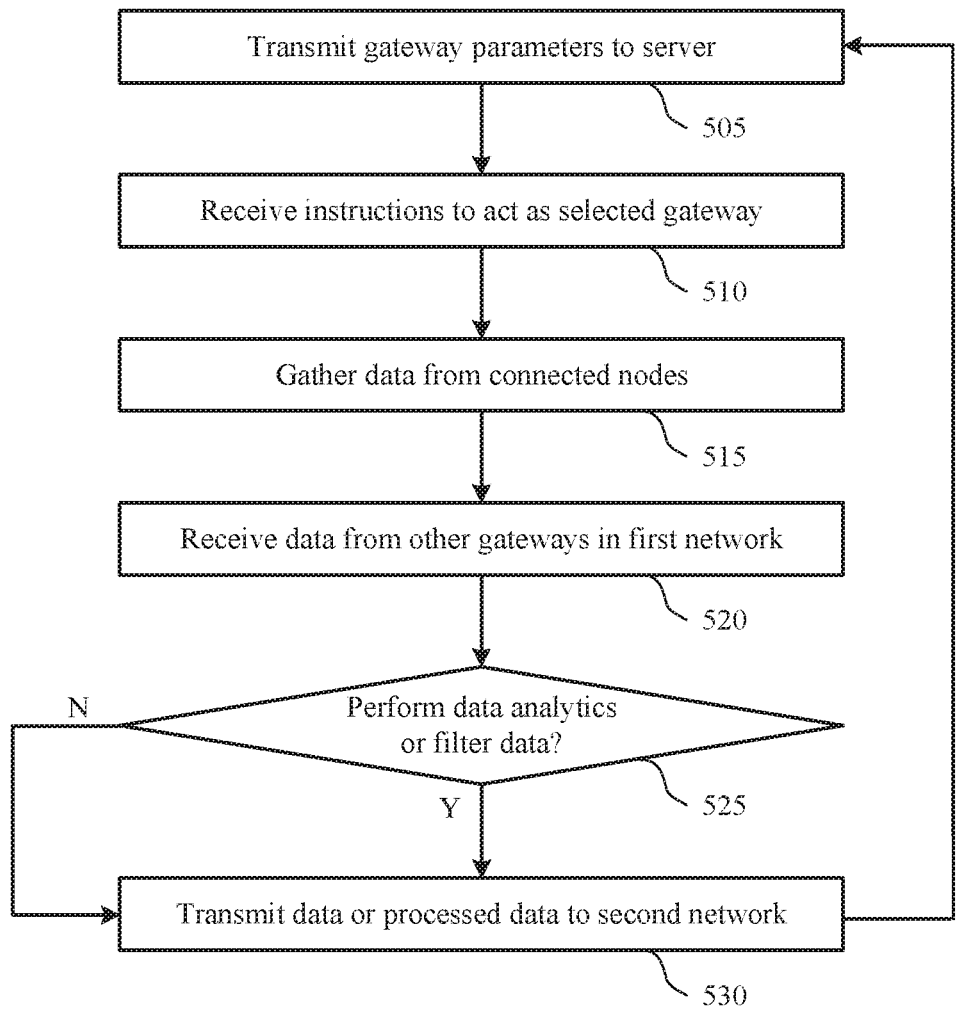
FIG. 5 illustrates an example of a flowchart that supports methods for a gateway to relay data from a full mesh network to an external network in accordance with aspects of the present disclosure.

FIG. 5 illustrates an example of a flowchart that supports a method 500 for a gateway to relay data from a full mesh network to an external network in accordance with aspects of the present disclosure. In some examples, method 500 may implement aspects of wireless communications system 100 and 200. The operations of method 500 may be implemented by a gateway or its components as described herein. For example, the operations of method 500 may be performed by a communications manager as described with reference to FIGS. 1 and 9-12. In some examples, a gateway may execute a set of instructions to control the functional elements of the gateway to perform the functions described below. Additionally or alternatively, a gateway may perform aspects of the functions described below using special-purpose hardware.

At 505, the gateway may transmit gateway parameters to a server to which the gateway is communicatively connected. The gateway parameters may relate to data rates, connection performance, traffic loads, battery power, location among the full-mesh network, parameters related to its connected nodes, and the like. The server may compare the gateway parameters of the gateway with gateway parameters of other gateways in the first (e.g., full-mesh) network. The server may select a gateway based on the comparison of the gateway parameters.

In the example of FIG. 5, the gateway is selected as the primary gateway. At 510, the gateway may receive instructions from the server or embedded full-mesh algorithm inside of the gateways to act as the selected gateway. While the gateway is acting as the selected gateway, it may be the only gateway in the first network to communicate with a second network external to the first network.

At 515, the gateway gathers data, information, or other network traffic from its connected nodes. At 520, the gateway receives node data, information, or network traffic from all of the other active gateways in the first network. At 525, the gateway determines if it is to perform data analytics or data filtering on the received data. In some examples, an AI component may perform the data analytics or data filtering. If so, it performs the processing on the data and proceeds to 530. If not, the gateway does not process the data and proceeds to 530. At 530, the gateway transmits the data or the processed data to a second network. Method 500 may repeat until the gateway selection expires or a new gateway is selected.

In some examples, the gateway receives traffic from the second network and distributes it to the other gateways in the first network accordingly.

Figure 6:
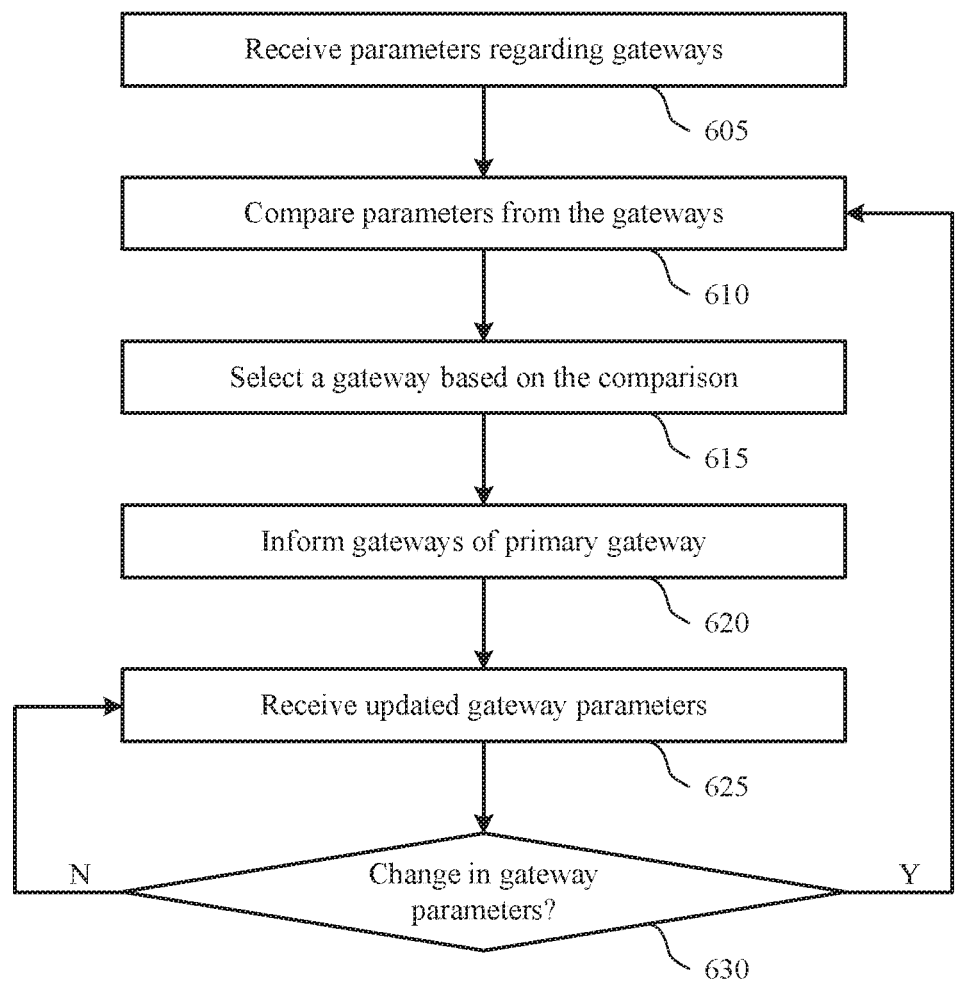
FIG. 6 illustrates an example of a flowchart that supports methods for selecting a gateway in accordance with aspects of the present disclosure.

FIG. 6 illustrates an example of a flowchart that supports a method 600 for a server or gateway to select a gateway in a full mesh network to act as a primary gateway in accordance with aspects of the present disclosure. In some examples, method 600 may implement aspects of wireless communications system 100 and 200. The operations of method 600 may be implemented by a gateway or its components as described herein. For example, the operations of method 600 may be performed by a communications manager as described with reference to FIGS. 1 and 9-12 or a server as described with reference to FIG. 2. In some examples, a gateway or server may execute a set of instructions to control the functional elements of the gateway or server to perform the functions described below. Additionally or alternatively, a gateway or server may perform aspects of the functions described below using special-purpose hardware.

At 605, the gateway or server may receive one or more parameters regarding gateways within a full-mesh network. The parameters may be related to the gateway, to nodes connected to the gateway, or to a network connection of the gateway. At 610, the gateway or server may compare at least some of the parameters from the different gateways to each other. At 615, a gateway may be selected as the primary gateway based at least in part on this comparison. The primary gateway may have a best performance for one or more parameters, or may have a best average. For example, the primary gateway may have a highest data rate among the gateways, the lowest traffic lag, the smallest traffic load, a highest battery power, proximity to a base station or an access point of an external network, a highest quality of service, a lowest error rate, or a combination thereof. In some examples, the selection may be based on an average or a weighted average (e.g., weighting factors may be applied to different parameters). Different criteria may be used for selecting the primary gateway in other examples.

At 620, the gateway or server may inform the gateways of which gateway is selected as the primary gateway. A signal may be sent that includes an identifier of the primary, selected gateway. The signal may also include instructions, such as an instruction to send all data or information to the primary gateway and to not communicate directly with the external network. In some examples, a timer will be associated with the primary gateway, whereupon the timer expiring, a new primary gateway is selected.

At 625, the gateway or server may receive updated gateway parameters from one or more of the gateways. The updated parameters may be send based on a timer, periodically sent, requested by the gateway or server, or sent when a triggering event occurs. The triggering event may include a change in one or more parameters, a loss of functionality at the selected gateway, a loss of connection at the selected gateway, expiration of a timer, or other event. At 630, the gateway or server may determine whether there has been a change in the gateway parameters by comparing the updated gateway parameters with the previous gateway parameters. If there has been a change, the gateway or server again compares the updated parameters at 610, selects a new primary gateway at 615, and informs the gateways of the selection at 620. In some cases, the newly selected primary gateway may be the same or different gateway as the previous gateway. If the primary gateway has not changed, the method 600 may not include again signaling the identity of the primary gateway.

Method 600 may repeat until the techniques are not desired to be used. For example, the full-mesh network may not need to use a single gateway to communicate to the external network. In such a situation, some or all of these techniques may not be employed. In other examples, modes may be used to trigger use of these techniques. For example, the full-mesh network may be in a single gateway mode where a primary gateway is selected, or an open mode where any gateway of the full-mesh network may communicate with an external network.

Figure 7:
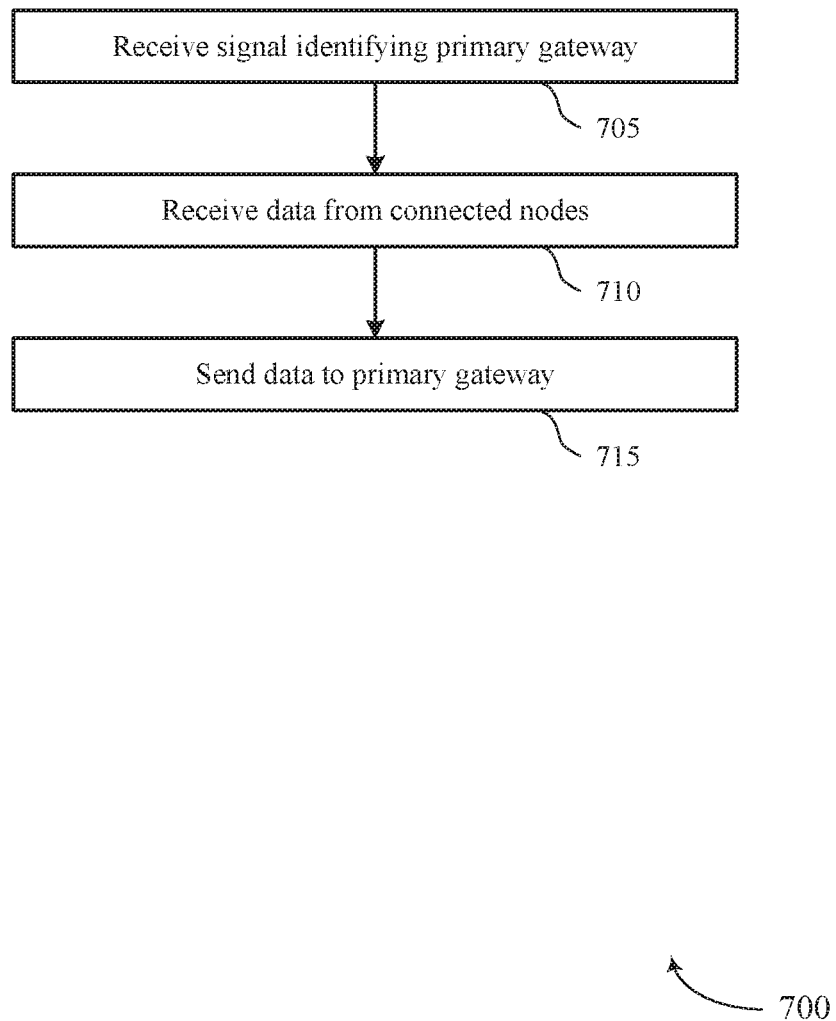
FIG. 7 illustrates an example of a flowchart that supports a gateway in a full mesh network to a selected gateway in accordance with aspects of the present disclosure.

FIG. 7 illustrates an example of a flowchart that supports a method 700 for a non-selected gateway to forward data in a full mesh network in accordance with aspects of the present disclosure. In some examples, method 700 may implement aspects of wireless communications system 100 and 200. The operations of method 700 may be implemented by a gateway or its components as described herein. For example, the operations of method 700 may be performed by a communications manager as described with reference to FIGS. 1 and 9-12 or a server as described with reference to FIG. 2. In some examples, a gateway may execute a set of instructions to control the functional elements of the gateway to perform the functions described below. Additionally or alternatively, a gateway may perform aspects of the functions described below using special-purpose hardware.

At 705, the gateway may receive a signal that identifies a primary gateway. In this example, the gateway is not selected as the primary gateway. The gateway may decode or parse the signal to determining the identity of the primary gateway or to receive instructions regarding what data or information to send to the primary gateway. The gateway may determine one or more conditions for the primary gateway to function as the primary gateway, including, for example, a time duration, a data rate threshold, or the like.

At 710, the gateway receives data from the nodes to which it is connected. The gateway may or may not perform processing on the data. In some examples, the gateway may perform edge computing on the data.

At 715, the gateway sends at least a portion of the data or information to the primary gateway. The gateway may not communicate directly with the external network. Instead, the primary gateway may forward at least a portion of the received data or information to the external network.

Figure 8:
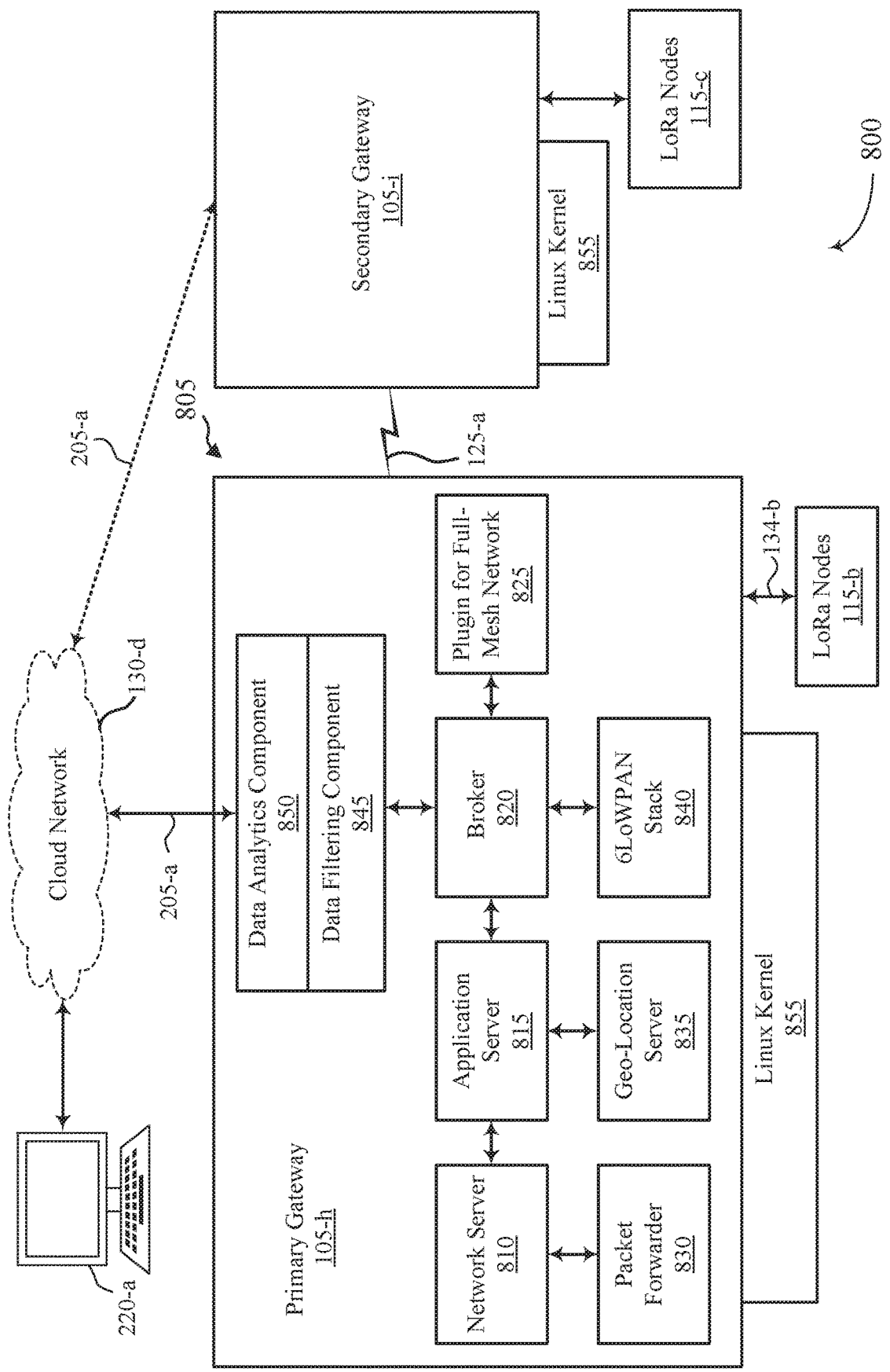
FIGS. 8 and 9 illustrate example block diagrams that support methods for edge computing in full mesh networks in accordance with aspects of the present disclosure.

FIG. 8 illustrates an example of a wireless communications system 800 that supports methods for edge computing in full mesh networks in accordance with aspects of the present disclosure. In some examples, wireless communications system 800 may implement aspects of wireless communications system 100 and 200 of FIGS. 1 and 2. Wireless communications system 800 includes a primary gateway 105-h which functions as the selected gateway as described herein. Wireless communications system 800 may also include a cloud network 130-d and one or more computing devices 220-a connected to cloud network 130-d.

Primary gateway 105-h is connected to at least one secondary gateway 105-i via a full-mesh network 805. In the full-mesh network 805, each gateway 105 in the full-mesh network 805 may communicate with every other gateway 105 in the full-mesh network 805 via communication links 125-a. The primary gateway 105-h functions as the selected gateway and communicates with cloud network 130-d over a communication link 205-a. Secondary gateway 105-i is a gateway in full-mesh network 805 that is not selected as the primary gateway. Although only a single secondary gateway 105-i is shown in FIG. 8, other numbers of secondary gateways may be included in full-mesh network 805. In this example, primary gateway 105-h and secondary gateway 105-i are LoRaWAN gateways.

Primary gateway 105-h may be connected to one or more LoRaWAN nodes 115-b. Likewise, secondary gateway 105-i may be connected to one or more LoRaWAN nodes 115-c. The LoRaWAN nodes 115-b and 115-c may be an example of one or more nodes 115 as described herein.

Primary gateway 105-h may include a number of components, such as a network server 810, an application server 815, a Message Queuing Telemetry Transport (MQTT) broker, Constrained Application Protocol (CoAP) Server, and Client 820 (shown as broker 820), a plugin for full-mesh networks 825, a packet forwarder 830, a geo-location server 835, a 6LoWPAN stack, a data filtering component 845, a data analytics component 850, and a Linux kernel 855. Other components may include a Real Time Operating System (RTOS) component, as well as AI and ML components. Other examples may include other or additional components which may use LPWAN protocols. Secondary gateway 105-i may also include some or all of these components. In some examples, additional components may be included, such as a key management server. One or more of these components may be part of a communications manager, such as the communications managers of FIGS. 1 and 9-12. These components may implement the full-mesh algorithm and techniques as described herein.

Some of the components of primary gateway 105-h may be conventionally located in cloud network 130-d. For example, network server 810 and application server 815 may conventionally be located in cloud network 130-d and their functions performed at cloud network 130-d. Techniques described herein relocate network server 810 and application server 815 to the gateways 105 which improves flexibility and functionality of edge computing, local data analytics, and filtering, AI and ML. Locating these components at the gateways 105 may also reduce costs and reduce the amount of network traffic. Furthermore, geo-location server 835 is locally implemented in the gateways 105, which also allows for edge computing of the geo-locations of the gateways 105. Techniques described herein change the LoRaWAN protocol architecture by moving some or all of the LoRaWAN components into the gateways for edge computing.

The network server 810 and the application server 815 may be a LoRaWAN network server and a LoRaWAN application server, respectively.

The MQTT broker 820 uses the MQTT protocol and subscribes to and publishes data across the components within the primary gateway 105-h.

Plugin for full-mesh networks 825 may be a plug-in that enables performance of the techniques described herein at primary gateway 105-h. That is, Plugin for full-mesh networks 825 may perform the comparison, calculation, and nomination of primary gateway 105-h. Plugin for full-mesh networks 825 may include a plugin for integration of the techniques to LoRaWAN components, full-mesh network, and data analytic software, along with AI and ML on the edge of the network.

Packet forwarder 830 forwards packets received at primary gateway 105-h to network server 810. The packets may come from nodes 115-b, a secondary gateway 105-i, or cloud network 130-d, for example.

Geo-location server 835 may be located in primary gateway 105-h. Geo-location server 835 may receive time-stamp data from a single node or sensor that was received at three or more gateways 105. Geo-location server 835 may use the data from these three different time-stamps to determine a location of a related gateway or node. In some examples, a geo-location server 835 is active inside of each gateway 105. When there are at least three gateways 105 within the network, geo-location server 835 may use triangulation to determine locations of the gateways 105. For example, geo-location server 835 may calculate the time-stamp of each gateway 105 or node 115 through the at least three gateways 105. The geo-location server 835 or gateway 105 may provide these timestamps to one or more gateways 115 in the network. For example, the timestamps may be provided to a primary gateway, such as primary gateway 105-*h*, and transfer all of the received timestamps to a master geo-server for geo-location calculations. Any gateway within the full-mesh network may be selected or nominated to deliver the timestamp or geo-location data. In some examples, a geo-server may be included in the network to communicate all end-device timestamps from the gateways 105 through another network (e.g., LTE, Wi-Fi or Ethernet, etc.) to calculate the geo-location.

In some examples, triangulation techniques can be used with three or more gateways 105 in order to determine the geolocation of the gateways 105. A triangulation module may calculate locations of gateways 105 or sensors, within or coupled to the gateways 105, based on time-stamp information. Some examples described herein may create a private and Free-GPS network that uses time-stamps from various sensors within at least three gateways 105 in the network. Each individual gateway 105 that includes a geo-location server 835 and/or a triangulation module may be able to calculate its geo-location and generate longitude, latitude, and elevation. These geo-locations may be transferred to the other gateways 105 using the full-mesh network topology, and in particular to the primary gateway 105-*h* with the cloud connection. The primary gateway 105-*h* does not itself need to have a triangulation module or geo-location server 853 in order to have this information. Furthermore, a gateway 105 may include a triangulation module or may be connected to one via the network.

An example may include ten gateways 105 in the full-mesh network, where all gateways 105 are equipped with a full-mesh dongle and at least three of the gateways are communicatively coupled to a triangulation module. The at least three gateways 105 receive at least one time-stamp of at least one sensor within the network. Every gateway 105 in the network includes a geo-location server 835 and is able to calculate the geolocation through the received timestamps. Once the geo-location is calculated by the local geo-location server 835, the gateway 105 prepares the geolocation to be sent to the cloud for further calculations and geo-positioning. If a particular gateway 105 is unable to communicate with the cloud, the geo-location information (e.g., longitude, latitude, and elevation of the sensor from another gateway) will be sent through the full-mesh network to another gateway that has cloud connection.

These geo-location techniques enable the range of the full-mesh network to be extended. The geo-location of sensors may be calculated locally and transferred between gateways, even if there is no cloud connection. This enables the full-mesh network to be independent from the cloud and not require satellite services. In some examples, less services from the cloud may be used by the full-mesh network. These techniques provide a fully operative private network with fully functional edge computing and services (e.g., microservices and web services).

6LoWPAN stack 840 may provide 6LoWPAN stack capabilities to primary gateway 105-*h*. In some examples, 6LoWPAN stack 840 may include a 6loWPAN stack along with an RTOS for implementation.

Data filtering component 845 may filter the data from nodes 115-*b* and 115-*c*. Different data filters may be used at data filtering component 845.

Data analytics component 850 may perform processing on the data from nodes 115-*b* and 115-*c*. In some examples, the data analytics component 850 may include a data analytics dashboard. Various analytics and processing may be used as described herein.

Linux kernel 855 may be a framework that runs the Linux operating system. In other examples, other operating systems and their associated kernels may be used.

In some examples, primary gateway 105-*h* uses a routing protocol for lossy network (RPL), which is a flexible multi-sink and single sink full-mesh algorithm. Conventional RPL algorithms are static single-sink algorithms, which means that only one specific gateway is nominated to deliver data within the network and that gateway does not change. In contrast, the flexible multi-sink algorithm may change the nomination of the primary gateway and also use the techniques described herein in a full-mesh algorithm.

The above description of FIG. 8 applies to a single-sink scenario. Single-sink is where a single gateway 105 is nominated as the primary gateway 105-*h*. However, in some examples, more than one primary gateway 105-*h* may be nominated. This may be referred to as multi-sink. For example, networks with large numbers of gateways 105 may have improved functionality with more than one primary gateway 105-*h*. The gateways 105 may be grouped into subsets, wherein each subset is associated with a unique primary gateway 105-*h*. Whether to use single-sink or multi-sink may depend upon network topology, network requirements, user needs, and the specific design of the network. In some examples, multi-sink may use load balancing techniques to determine how many primary gateways 105-*h* to use as well as how to distribute data forwarding tasks between them.

Figure 9:
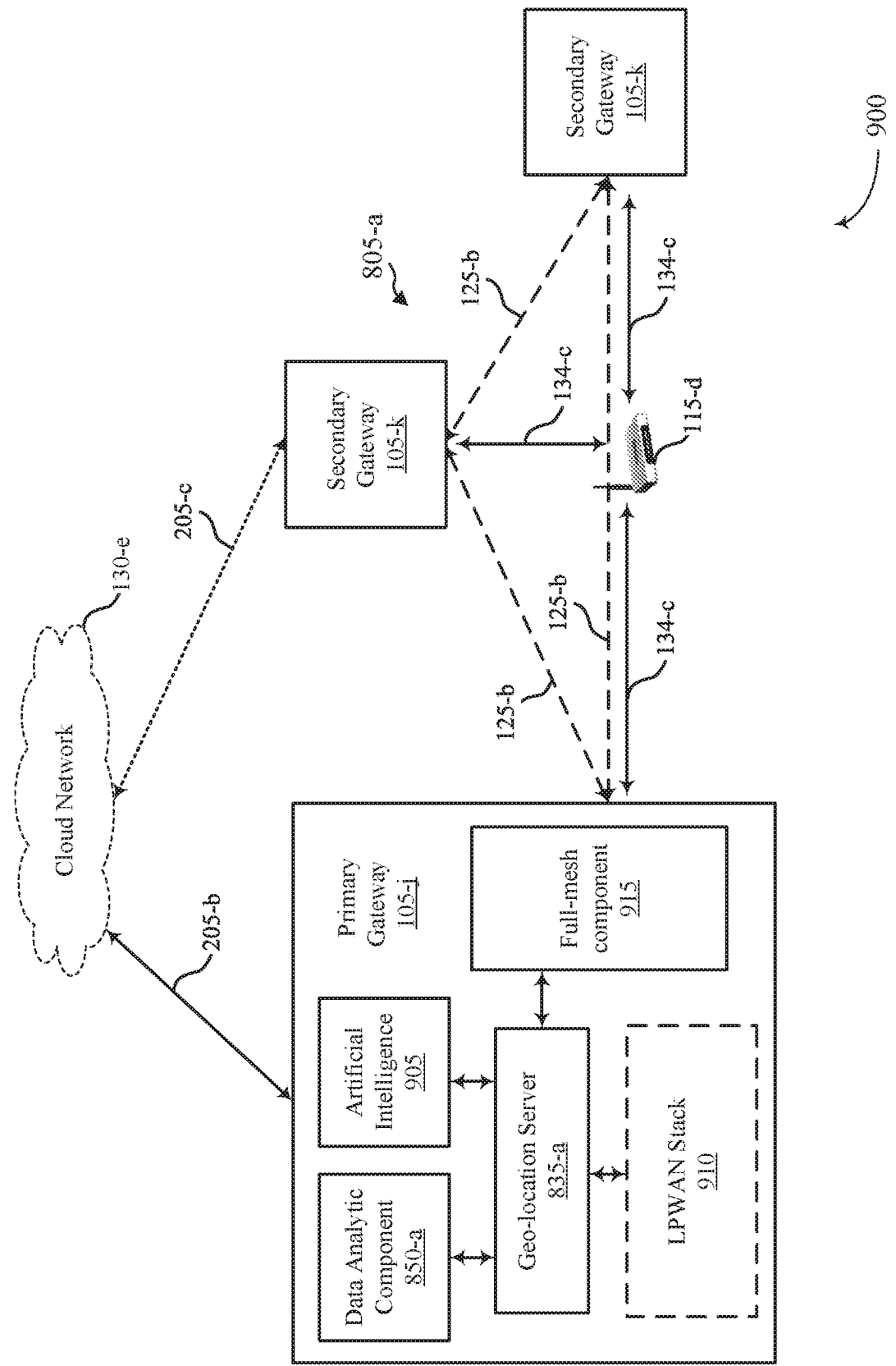

FIG. 9 illustrates an example of a wireless communications system 900 that supports methods for edge computing in full mesh networks in accordance with aspects of the present disclosure. In some examples, wireless communications system 900 may implement aspects of wireless communications system 100, 200, and 800 of FIGS. 1, 2, and 8. Wireless communications system 900 includes a primary gateway 105-*j* which functions as the selected gateway as described herein. The primary gateway 105-*j* may be a gateway with edge computing, such as the gateway with edge computing 105-*e* of FIG. 4. Wireless communications system 900 may also include a cloud network 130-*e* and one or more computing devices 220-*a* connected to cloud network 130-*e*.

Primary gateway 105-*j* is connected to at least two secondary gateways 105-*k* via a full-mesh network 805-*a*. In the full-mesh network 805-*a*, each gateway 105 in the full-mesh network 805-*a* may communicate with every other gateway 105 in the full-mesh network 805-*a* via communication links 125-*b*. The primary gateway 105-*j* functions as the selected gateway and communicates with cloud network 130-*e* over a communication link 205-*b*. The communication link 205-*b* is a direct communication link, meaning that the information from nodes connected to primary gateway 105-*j*, such as a node 115-*d*. The secondary gateways 105-*k* are gateways in full-mesh network 805-*a* that are not selected as the primary gateway. At least one of the secondary gateways 105-*k* may have a communication link 205-*c* to cloud network 130-*e*. In contrast with communication link 205-*b*, in this example, the communication link 205-*c* is an indirect communication link. Although only a two secondary gateways 105-*k* are shown in FIG. 9, other numbers of secondary gateways may be included in full-mesh network 805-*a*. In this example, primary gateway 105-*j* and the secondary gateways 105-*k* are LoRaWAN gateways.

Primary gateway 105-*j* and the secondary gateways 105-*k* may be connected to one or more LoRaWAN nodes 115-*d*. LoRaWAN node 115-*d* may be an example of one or more nodes 115 as described herein.

Primary gateway 105-*j* may include a number of components, such as a data analytics component 850-*a*, an artificial intelligence component 905, a full-mesh component 915, a geo-location server 835-*a*, and a 6PWAN stack 910. In some examples, the primary gateway 105-*j* may also include other LoRaWAN components. In other examples, primary gateway 105-*j* includes more or less components, as described herein. For example, additional components may be included, such as a key management server, a packet forwarder, an application server, a network filter, and a network server, among others. The secondary gateways 105-*k* may also include some or all of these components. One or more of these components may be part of a communications manager, such as the communications managers of FIGS. 1 and 10-13. These components may implement the full-mesh algorithm and techniques as described herein.

Some of the components of primary gateway 105-*j* may be conventionally located in cloud network 130-*e*. Techniques described herein change the LoRaWAN protocol architecture by moving some or all of the LoRaWAN components into the gateways for edge computing.

In some examples, full-mesh component 925 is an aspect of or include a plugin for full-mesh network 825 as described in FIG. 8. Full-mesh component 925 may enable performance of the techniques described herein at primary gateway 105-*j*. That is, full-mesh component 925 may perform the comparison, calculation, and nomination of primary gateway 105-*k*. full-mesh component 925 may integrate the techniques for the LoRaWAN components, LPWAN or other wireless protocols components, full-mesh network 805-*a*, data analytic software, along with AI and ML on the edge of the full-mesh network 805-*a*.

Geo-location server 835-*a* may be located in primary gateway 105-*j*. Geo-location server 835-*a* may receive timestamp data from a single node 115-*d* or sensor that was received at three or more gateways 105. Geo-location server 835-*a* may use the data from these three different timestamps to determine a location of a related gateway or node.

Artificial intelligence component 905 may apply artificial intelligence or machine learning to the techniques described herein for edge computing in full mesh networks. Artificial intelligence component 905 may apply different algorithms and concepts, as well as adaptive learning, to the analysis for determining which gateway 105 in full-mesh network 805-*a* to select as the primary gateway.

LPWAN stack 910 may provide LPWAN stack capabilities to primary gateway 105-*j*. In some examples, LPWAN stack 910 may include a 6LoWPAN Stack along with an RTOS for implementation. In other examples, LPWAN stack 910 may support multiple protocols.

Data analytics component 850-*a* may perform processing on the data from node 115-*d* and other nodes. In some examples, the data analytics component 850-*a* may include a data analytics dashboard which enables a user to view, manipulate, analyze, or otherwise process the data. Various analytics and processing may be used as described herein.

Figure 10:
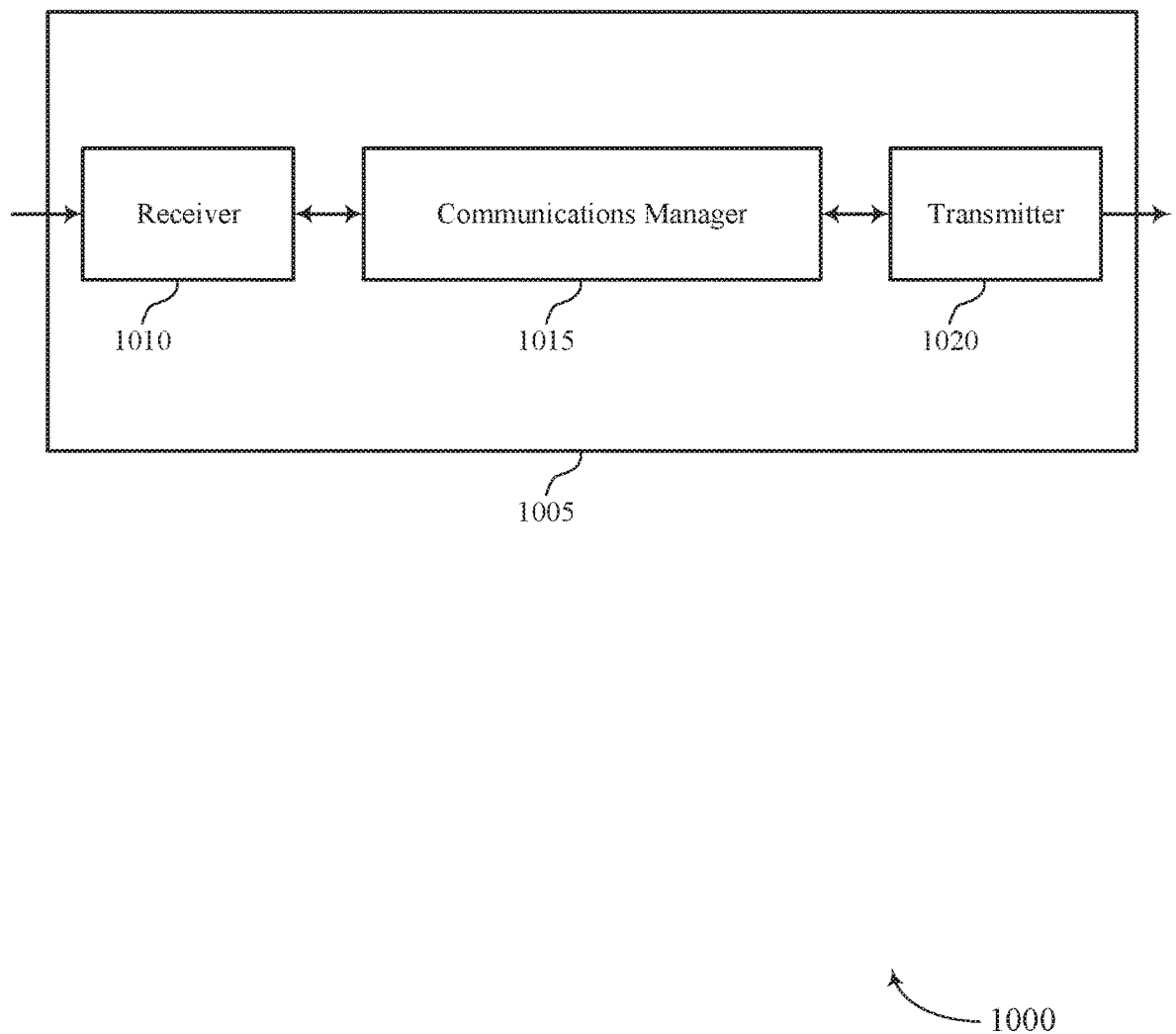
FIGS. 10 and 11 show block diagrams of devices that support methods for edge computing in full mesh networks in accordance with aspects of the present disclosure.

FIG. 10 shows a block diagram 1000 of a device 1005 that supports edge computing full-mesh internet of things gateway in accordance with aspects of the present disclosure. The device 1005 may be an example of aspects of a gateway 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to edge computing full-mesh internet of things gateway, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine one or more parameters corresponding to each of two or more gateways in a first network, select a first gateway of the two or more gateways based on the one or more parameters, and instruct at least a second gateway of the two or more gateways to send information to the first gateway, where the first gateway provides the information to a second network. The communications manager 1015 may be an example of aspects of the communications manager 1310 described herein.

The communications manager 1015, or its sub-components, may be implemented in hardware, code (e.g., software, firmware, or operating system) executed by a processor, or any combination thereof. If implemented in code executed by a processor, the functions of the communications manager 1015, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (110) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the device 1005 may include two or more receivers 1010 and two or more transmitters 1020, or may be combined into two or more transceivers. The receivers 1010 and the transmitters 1020 may be modular. A modular receiver 1010 or transmitter 1020 may make them easily replaceable, which may bring more flexibility and ease of integration of different protocols to the device 1005. For example, one receiver 1010 and transmitter 1020 may include hardware that supports the LoRaWAN protocol, while another receiver 1010 and transmitter 1020 may include hardware that supports a different protocol. In some examples, the receivers 1010 and transmitters 1020 support multiple protocols.

Figure 11:
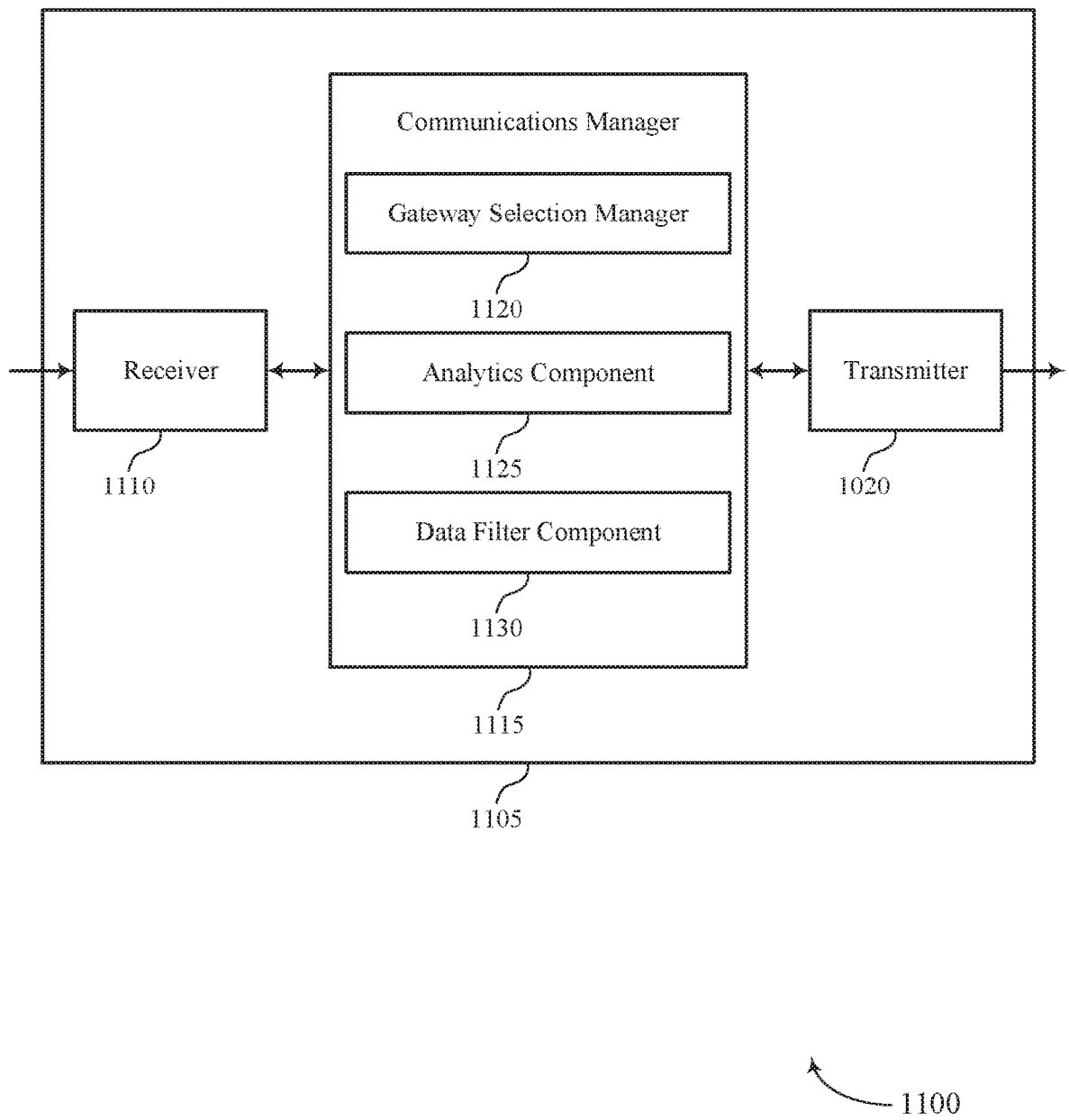
Figure 12:
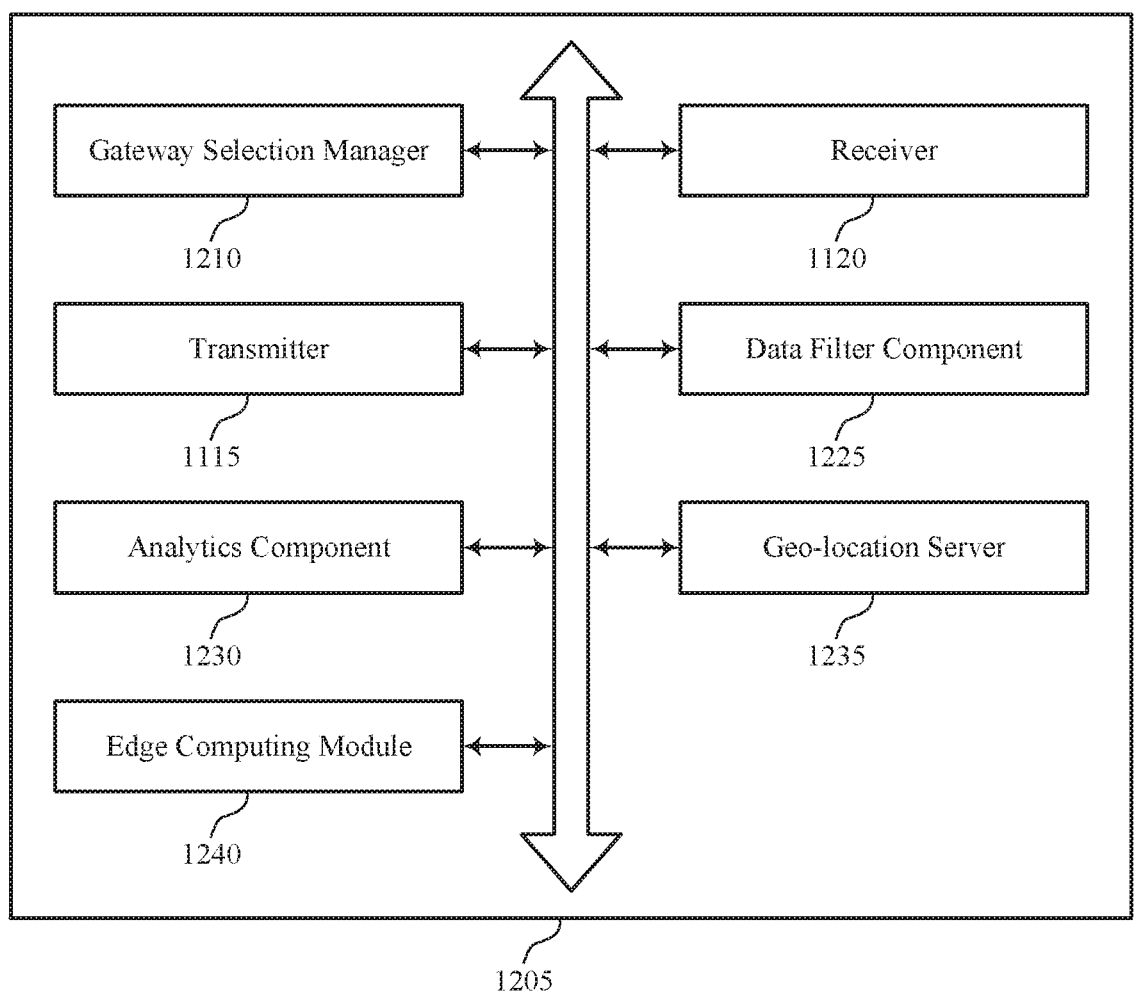
FIG. 12 shows a block diagram of a communications manager that supports methods for edge computing in full mesh networks in accordance with aspects of the present disclosure.

FIG. 11 shows a block diagram 1100 of a device 1105 that supports edge computing full-mesh Internet of things gateway in accordance with aspects of the present disclosure. The device 1105 may be an example of aspects of a device 1005, or a gateway 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to edge computing full-mesh internet of things gateway, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 and 140 as described herein. The communications manager 1115 may include a gateway selection manager 1120, an analytics component 1025, and a data filter component 1030. The communications manager 1115 may be an example of aspects of the communications manager 1310 described herein.

The gateway selection manager 1120 may determine one or more parameters corresponding to each of two or more gateways in a first network and select a first gateway of the two or more gateways based on the one or more parameters.

The analytics component 1125 may perform data processing on the node data. Likewise, the data filter component 1130 may filter the node data. In some examples, the analytics component 1125 may include an artificial intelligence or machine learning component and may perform analytics accordingly. In other examples, the device 1105 may include one or more separate AI or ML components.

The transmitter 1120 may transmit signals generated by other components of the device 1105. The transmitter 1120 may instruct at least a second gateway of the two or more gateways to send information to the first gateway, where the first gateway provides the information to a second network. In some examples, the transmitter 1120 may be collocated with a receiver 1110 in a transceiver module. For example, the transmitter 1120 may be an example of aspects of the transceiver 1320 described with reference to FIG. 13. The transmitter 1120 may utilize a single antenna or a set of antennas.

FIG. 9 shows a block diagram 1200 of a communications manager 1205 that supports edge computing full-mesh internet of things gateway in accordance with aspects of the present disclosure. The communications manager 1205 may be an example of aspects of a communications manager 140, a communications manager 1015, a communications manager 1115, or a communications manager 1310 described herein. The communications manager 1205 may include a gateway selection manager 1210, a transmitter 1215, a receiver 1220, a data filter component 1225, an analytics component 1230, a geo-location server 1235, and an edge computing module 1240 as well as AI and ML. Each of these modules may communicate, directly or indirectly, with one another (e.g., via one or more buses).

The gateway selection manager 1210 may determine one or more parameters corresponding to each of two or more gateways in a first network. In some examples, the gateway selection manager 1210 may select a first gateway of the two or more gateways based on the one or more parameters. In some examples, the gateway selection manager 1210 may select a third gateway of the two or more gateways based on the one or more parameters. In some examples, the gateway selection manager 1210 may determine that the first gateway has a connection with a cloud-based network.

In some examples, the gateway selection manager 1210 may compare the one or more parameters of each gateway of the two or more gateways. In some examples, the gateway selection manager 1210 may determine that the first gateway is the least busy gateway of the two or more gateways based on the comparison. In some examples, if all of the existing gateways within the network have connection to the cloud, the least busy gateway may be selected. Otherwise, if only one gateway has cloud connection, then that gateway may be selected by default. In some examples, the gateway selection manager 1210 may gather information associated with data generated at the first network at a first node of the first network.

In some examples, the gateway selection manager 1210 may determine the one or more parameters corresponding to each of two or more gateways in the first network at a second time. In some examples, the gateway selection manager 1210 may update the selected first gateway of the two or more gateways based on the one or more parameters determined at the second time. In some cases, the one or more parameters includes at least one of a network delay at each gateway, a data rate of each gateway, and network traffic at the gateway.

The transmitter 1215 may instruct at least a second gateway of the two or more gateways to send information to the first gateway, where the first gateway provides the information to a second network. In some examples, the transmitter 1215 may instruct at least a fourth gateway of the two or more gateways to send information to the third gateway. In some examples, the transmitter 1215 may send the information to the second network via the first gateway.

In some examples, the transmitter 1215 may forward the information to a third gateway, where the third gateway neighbors the first gateway and sends the information to the second network. In some examples, the transmitter 1215 may instruct all other gateways of the two or more gateways to send additional information to the first gateway, where the first gateway provides the additional information to the second network.

The receiver 1220 may receive the information at the first gateway from at least the second gateway of the two or more gateways.

The data filter component 1225 may perform data filtering on the information at the first gateway to generate filtered information, where sending the information to the second network further includes sending the filtered information.

The analytics component 1230 may perform an analytics analysis on the data at the first gateway to generate analyzed information, where sending the information to the second network further includes sending the analyzed information.

The geo-location server 1235 may determine a geolocation of the one or more nodes. In some examples, the geo-location server 1235 may be an example of the geo-location server 835 and 835-a of FIGS. 8 and 9, respectively.

The edge computing module 1240 may perform a cloud component functionality at an edge computing along with AI and ML device of the first network.

Figure 13:
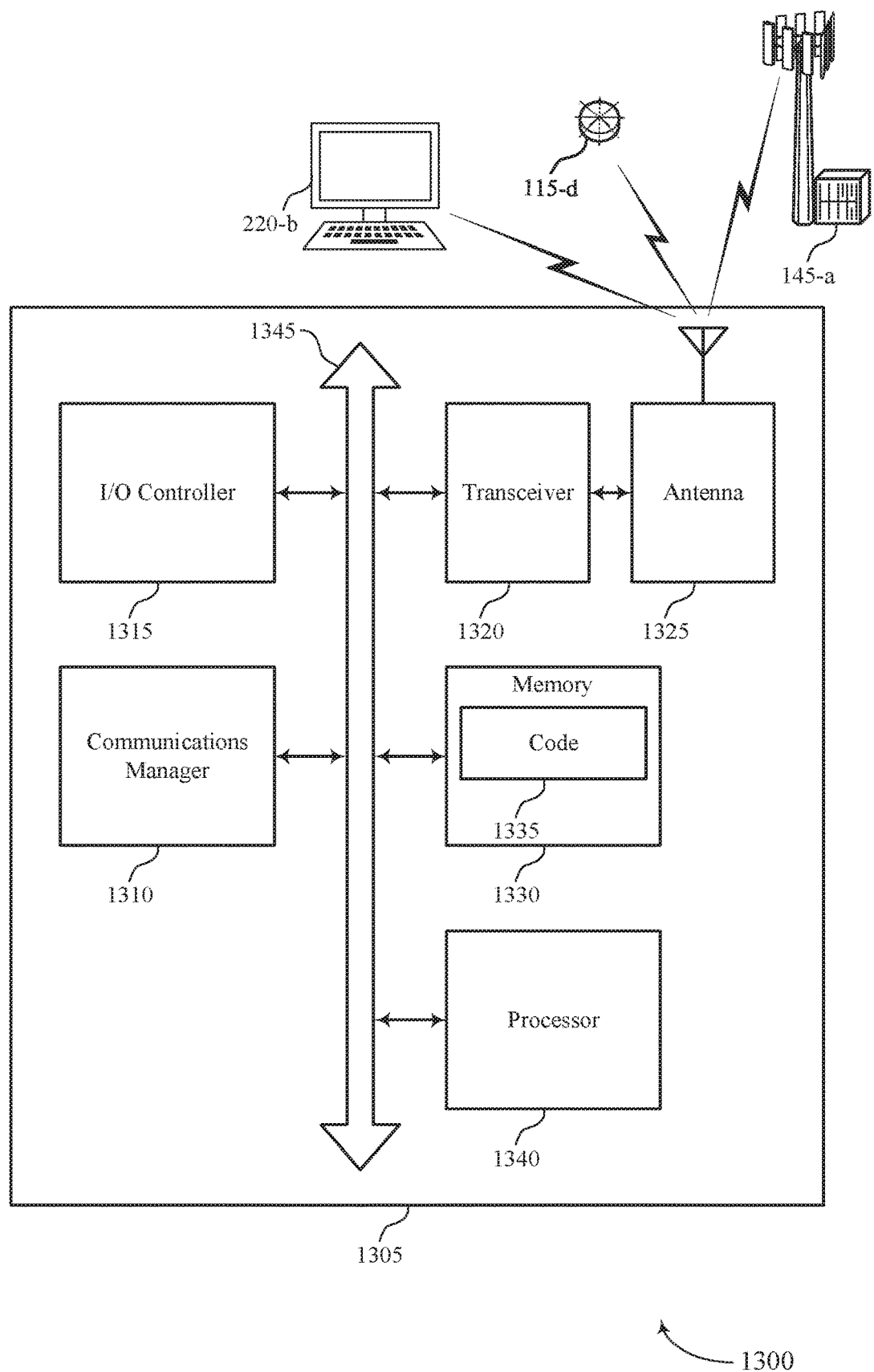
FIG. 13 shows a diagram of a system including a device that supports methods for edge computing in full mesh networks in accordance with aspects of the present disclosure.

FIG. 13 shows a diagram of a system 1300 including a device 1305 that supports edge computing full-mesh internet of things gateway in accordance with aspects of the present disclosure. The device 1305 may be an example of or include the components of device 1005, device 1105, or a gateway 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine one or more parameters corresponding to each of two or more gateways in a first network, select a first gateway of the two or more gateways based on the one or more parameters, and instruct at least a second gateway of the two or more gateways to send information to the first gateway, where the first gateway provides the information to a second network.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting edge computing full-mesh internet of things gateway).

The communications manager 1345 may manage communications with other gateway 105 and base stations 145-a, nodes 115-d, and edge computing devices 220-b and may include a controller or scheduler for controlling communications with gateways 105 in cooperation with other base stations 145-a. For example, the communications manager 1345 may coordinate scheduling for transmissions to base station 145-a for various interference mitigation techniques such as beamforming or joint transmission. In some examples, the communications manager 1345 may provide an X2 interface within an LTE/LTE-A wireless communication network technology to provide communication to one or more base stations 145.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
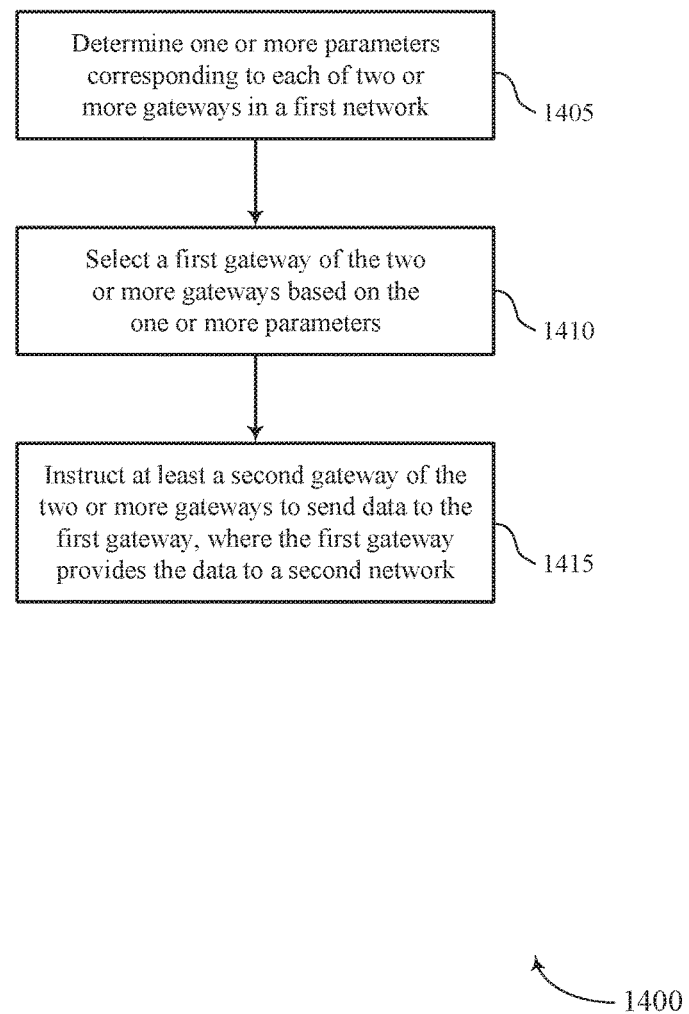
FIGS. 14 and 15 show flowcharts illustrating methods that support methods for edge computing in full mesh networks in accordance with aspects of the present disclosure.

FIG. 14 shows a flowchart illustrating a method 1400 that supports edge computing in full mesh networks in accordance with aspects of the present disclosure. The operations of method 1400 may be implemented by a wireless device or its components as described herein. For example, the operations of method 1400 may be performed by a communications manager as described with reference to FIGS. 1 and 10-13. In some examples, a wireless device may execute a set of instructions to control the functional elements of the wireless device to perform the functions described below. Additionally or alternatively, a wireless device may perform aspects of the functions described below using special-purpose hardware.

At 1405, the wireless device may determine one or more parameters corresponding to each of two or more gateways in a first network. The operations of 1405 may be performed according to the methods described herein. In some examples, aspects of the operations of 1405 may be performed by a gateway selection manager as described with reference to FIGS. 1 and 10-13.

At 1410, the wireless device may select a first gateway of the two or more gateways based on the one or more parameters. The operations of 1410 may be performed according to the methods described herein. In some examples, aspects of the operations of 1410 may be performed by a gateway selection manager as described with reference to FIGS. 1 and 10-13.

At 1415, the wireless device may instruct at least a second gateway of the two or more gateways to send data to the first gateway, where the first gateway provides the data to a second network. The operations of 1415 may be performed according to the methods described herein. In some examples, aspects of the operations of 1415 may be performed by a gateway selection manager as described with reference to FIGS. 1 and 10-13.

Figure 15:
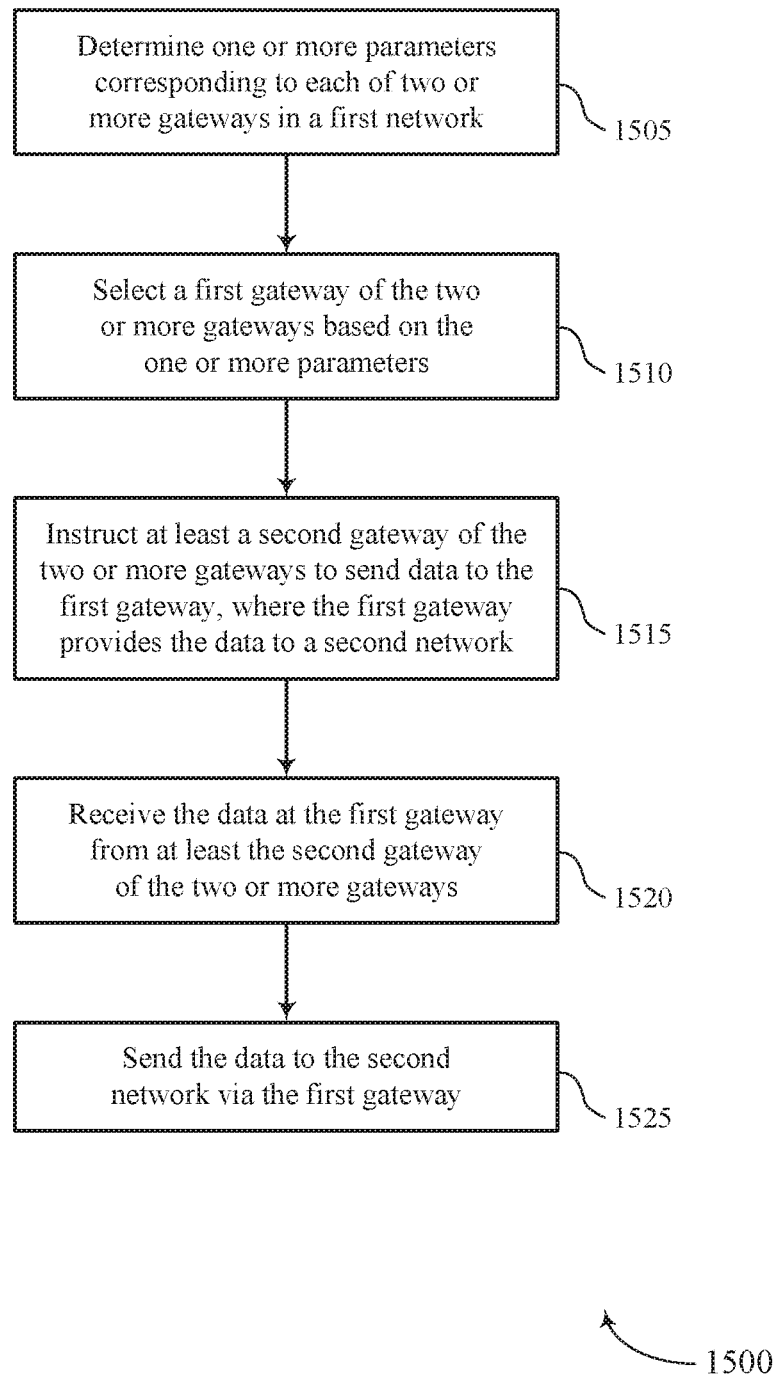

FIG. 15 shows a flowchart illustrating a method 1500 that supports methods for edge computing in full mesh networks in accordance with aspects of the present disclosure. The operations of method 1500 may be implemented by a wireless device or its components as described herein. For example, the operations of method 1500 may be performed by a communications manager as described with reference to FIGS. 1 and 10-13. In some examples, a wireless device may execute a set of instructions to control the functional elements of the wireless device to perform the functions described below. Additionally or alternatively, a wireless device may perform aspects of the functions described below using special-purpose hardware.

At 1505, the wireless device may determine one or more parameters corresponding to each of two or more gateways in a first network. The operations of 1505 may be performed according to the methods described herein. In some examples, aspects of the operations of 1505 may be performed by a gateway selection manager as described with reference to FIGS. 1 and 10-13.

At 1510, the wireless device may select a first gateway of the two or more gateways based on the one or more parameters. The operations of 1510 may be performed according to the methods described herein. In some examples, aspects of the operations of 1510 may be performed by a gateway selection manager as described with reference to FIGS. 1 and 10-13.

At 1515, the wireless device may instruct at least a second gateway of the two or more gateways to send data to the first gateway, where the first gateway provides the data to a second network. The operations of 1515 may be performed according to the methods described herein. In some examples, aspects of the operations of 1515 may be performed by a gateway selection manager as described with reference to FIGS. 1 and 10-13.

At 1520, the wireless device may receive the data at the first gateway from at least the second gateway of the two or more gateways. The operations of 1520 may be performed according to the methods described herein. In some examples, aspects of the operations of 1520 may be performed by a receiver as described with reference to FIGS. 1 and 10-13.

At 1525, the wireless device may send the data to the second network via the first gateway. The operations of 1525 may be performed according to the methods described herein. In some examples, aspects of the operations of 1525 may be performed by a transmitter as described with reference to FIGS. 1 and 10-13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining one or more parameters corresponding to each of three or more gateways in a first network, wherein each of the three or more gateways is directly connected to every other gateway of the three or more gateways;
   selecting a first gateway of the three or more gateways based at least in part on the one or more parameters; and
   instructing each of a set of the three or more gateways to send data to the first gateway, wherein the first gateway provides the data to a second network, and wherein the set of the three or more gateways includes all of the gateways except for the first gateway.

2. The method of claim 1, further comprising:
   selecting a third gateway of the three or more gateways based at least in part on the one or more parameters; and
   instructing at least a fourth gateway of the three or more gateways to send data to the third gateway.

3. The method of claim 1, further comprising:
   receiving the data at the first gateway from at least the second gateway of the three or more gateways; and
   sending the data to the second network via the first gateway.

4. The method of claim 3, further comprising:
   performing data filtering on the data at the first gateway to generate filtered data, wherein sending the data to the second network further comprises sending the filtered data.

5. The method of claim 3, further comprising:
   performing an analytics analysis and one or both of artificial intelligence (AT) or machine learning (ML) processing on the data at the first gateway to generate information, wherein sending the data to the second network further comprises sending the information.

6. The method of claim 3, further comprising:
   forwarding the data to a third gateway, wherein the third gateway neighbors the first gateway and sends the data to the second network.

7. The method of claim 1, wherein selecting the first gateway of the three or more gateways based at least in part on the one or more parameters further comprises:
   comparing the one or more parameters of each gateway of the three or more gateways; and
   determining that the first gateway is a least busy gateway of the three or more gateways based at least in part on the comparison.

8. The method of claim 1, wherein the one or more parameters includes at least one of a network delay at each gateway, a data rate of each gateway, and network traffic at the gateway.

9. The method of claim 1, wherein the first network is an Interne of-Things (IoT) network and the second network is a cloud-based network.

10. The method of claim 1, wherein the three or more gateways are Low-Power, Wide-Area Network (LPWAN) gateways.

11. The method of claim 1, wherein the data is gathered at one or more nodes connected to the second gateway.

12. The method of claim 11, further comprising:
determining a geolocation of the one or more nodes.

13. The method of claim 1, wherein determining the one or more parameters further comprises determining the one or more parameters at a first time, the method further comprising:
determining the one or more parameters corresponding to each of three or more gateways in the first network at a second time; and
updating the selected first gateway of the three or more gateways based at least in part on the one or more parameters determined at the second time.

14. The method of claim 1, further comprising:
instructing all other gateways of the three or more gateways to send additional data to the first gateway, wherein the first gateway provides the additional data to the second network.

15. The method of claim 1, further comprising:
providing the data to an edge computer connected with the first network.

16. The method of claim 1, wherein each gateway of the three or more gateways is directly connected to the second network.

17. An apparatus for wireless communication, comprising: a processor, memory coupled with the processor; and instructions stored in the memory and executable by the processor to cause the apparatus to:
determine one or more parameters corresponding to each of three or more gateways in a first network, wherein each of the three or more gateways is directly connected to every other gateway of the three or more gateways;
select a first gateway of the three or more gateways based at least in part on the one or more parameters; and
instruct each of a set of the three or more gateways to send data to the first gateway, wherein the first gateway provides the data to a second network, and wherein the set of the three or more gateways includes all of the gateways except for the first gateway.

18. The apparatus of claim 17, the instructions further executable by the processor to cause the apparatus to:
receive the data at the first gateway from at least the second gateway of the three or more gateways; and
send the data to the second network via the first gateway.

19. The apparatus of claim 18, the instructions further executable by the processor to cause the apparatus to:
perform data filtering on the data at the first gateway to generate filtered data or perform an analytics analysis and one or both of artificial intelligence (AI) or machine learning (ML) processing on the data at the first gateway to generate information, wherein sending the data to the second network further comprises sending the filtered data or sending the information.

20. A non-transitory computer-readable medium storing code for wireless communication, the code comprising instructions executable by a processor to:
determine one or more parameters corresponding to each of three or more gateways in a first network, wherein each of the three or more gateways is directly connected to every other gateway of the three or more gateways;
select a first gateway of the three or more gateways based at least in part on the one or more parameters; and
instruct each of a set of the three or more gateways to send data to the first gateway, wherein the first gateway provides the data to a second network, and wherein the set of the three or more gateways includes all of the gateways except for the first gateway.

* * * * *